United States Patent
Ohbitsu

(10) Patent No.: US 9,477,305 B2
(45) Date of Patent: Oct. 25, 2016

(54) STEREOSCOPIC IMAGE DISPLAY APPARATUS AND COMPUTER-READABLE RECORDING MEDIUM STORING PROGRAM THEREON

(71) Applicant: FUJITSU LIMITED, Kawasaki-shi, Kanagawa (JP)

(72) Inventor: Toshiro Ohbitsu, Akishima (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/341,258

(22) Filed: Jul. 25, 2014

(65) Prior Publication Data

US 2014/0333532 A1    Nov. 13, 2014

Related U.S. Application Data

(63) Continuation of application No. PCT/JP2012/055750, filed on Mar. 7, 2012.

(51) Int. Cl.
| | |
|---|---|
| G06F 3/13 | (2006.01) |
| H04N 13/04 | (2006.01) |
| G06F 3/01 | (2006.01) |
| H04N 13/00 | (2006.01) |
| G02B 27/22 | (2006.01) |

(52) U.S. Cl.
CPC ............ G06F 3/013 (2013.01); G02B 27/2214 (2013.01); H04N 13/0022 (2013.01); H04N 13/0404 (2013.01); H04N 13/0484 (2013.01)

(58) Field of Classification Search
CPC .............. G06F 3/013; G02B 27/2214; H04N 13/0404
See application file for complete search history.

(56) References Cited

U.S. PATENT DOCUMENTS

| | | | | |
|---|---|---|---|---|
| 2011/0013000 | A1* | 1/2011 | Mori | H04N 13/0452 348/51 |
| 2011/0051239 | A1* | 3/2011 | Daiku | G02B 27/0093 359/464 |
| 2011/0090323 | A1 | 4/2011 | Shibata | |
| 2011/0254925 | A1 | 10/2011 | Ushiki et al. | |
| 2012/0105611 | A1* | 5/2012 | Godar | H04N 13/0003 348/54 |
| 2012/0206444 | A1* | 8/2012 | Takahashi | H04N 13/0475 345/419 |

FOREIGN PATENT DOCUMENTS

| | | |
|---|---|---|
| JP | H04-035192 A | 2/1992 |
| JP | 08-314034 A | 11/1996 |
| JP | 2004-282217 A | 10/2004 |
| JP | 2004-289527 | 10/2004 |

(Continued)

OTHER PUBLICATIONS

International Search Report, mailed in connection with PCT/JP2012/055750 and mailed May 29, 2012.

(Continued)

*Primary Examiner* — Ariel Balaoing
(74) *Attorney, Agent, or Firm* — Fujitsu Patent Center

(57) ABSTRACT

A stereoscopic image display apparatus includes: a distance measuring unit that measures a distance to a viewer; a selecting unit that selects parallax images having a binocular parallax amount corresponding to the measured distance to the viewer from parallax images of a display object based on the measured distance to the viewer as a stereoscopic image pair; and a display control unit that causes a display unit to display the selected stereoscopic display image pair.

10 Claims, 29 Drawing Sheets

(56) References Cited

FOREIGN PATENT DOCUMENTS

| | | |
|---|---|---|
| JP | 2006-229725 A | 8/2006 |
| JP | 2006-349921 A | 12/2006 |
| JP | 2008-185629 A | 8/2008 |
| JP | 2009-296118 A | 12/2009 |
| JP | 2010-54559 | 3/2010 |
| JP | 2010-200253 A | 9/2010 |
| JP | 2011-91481 | 5/2011 |
| JP | 2011-141381 A | 7/2011 |
| JP | 2011-223482 | 11/2011 |
| JP | 2012-010136 A | 1/2012 |
| JP | 2012-23567 | 2/2012 |

OTHER PUBLICATIONS

CNOA—Office Action of Chinese Patent Application No. 201280071219.X, dated Oct. 23, 2015, with full English translation.

JPOA—Office Action of Japanese Patent Application No. 2014-503329 dated Nov. 24, 2015, with Partial English Translation of the Office Action.

Japanese Office Action mailed Jun. 28, 2016 for corresponding Japanese Patent Application No. 2014-503329, with partial English Translation, 3 pages.

* cited by examiner

| R7 7L | G8 8R | B1 1L | R2 2R | G3 3L | B4 4R |
| --- | --- | --- | --- | --- | --- |
| R8 8R | G1 1L | B2 2R | R3 3L | G4 4R | B5 5L |
| R1 1L | G2 2R | B3 3L | R4 4R | G5 5L | B6 6R |

10a

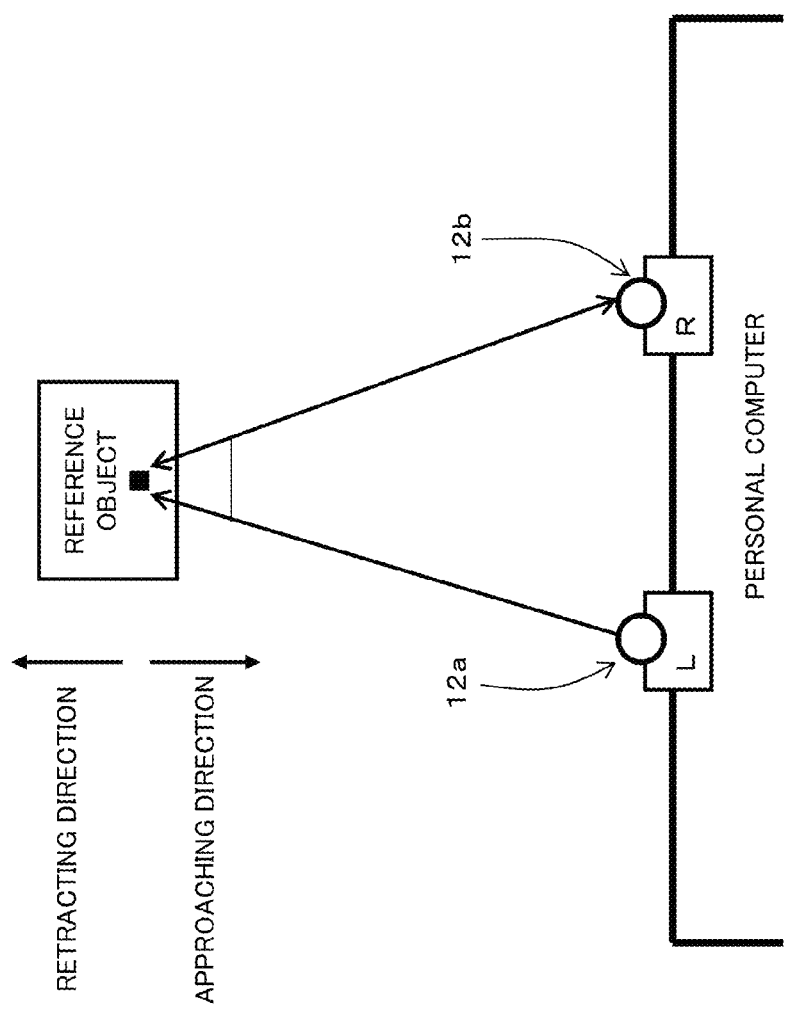

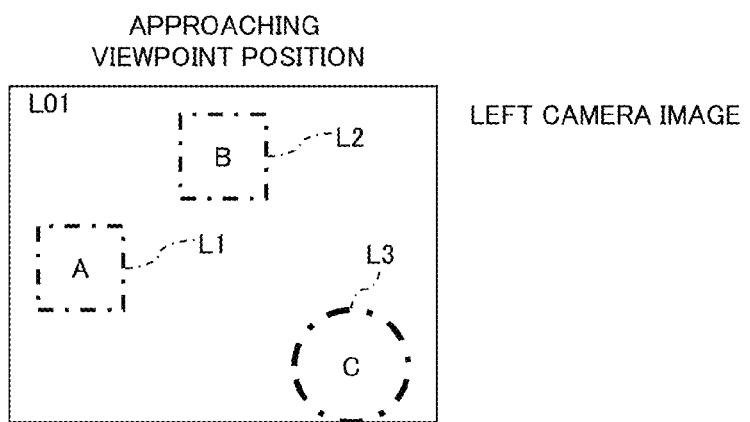
FIG. 14A — LEFT CAMERA IMAGE
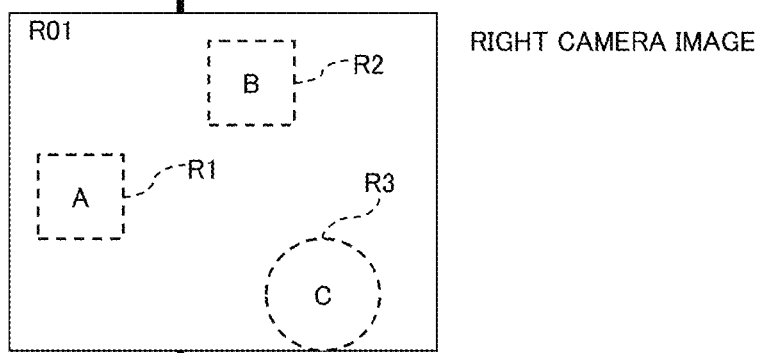
FIG. 14B — RIGHT CAMERA IMAGE
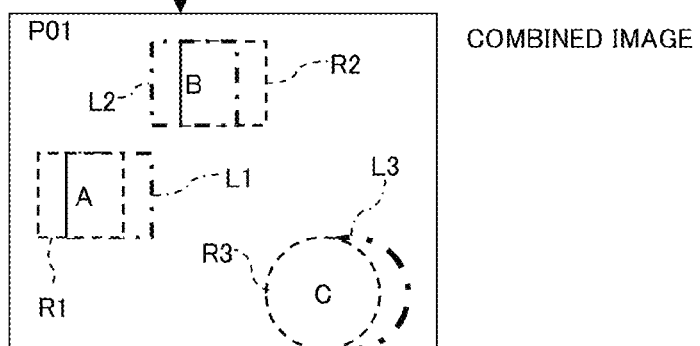
FIG. 14C — COMBINED IMAGE

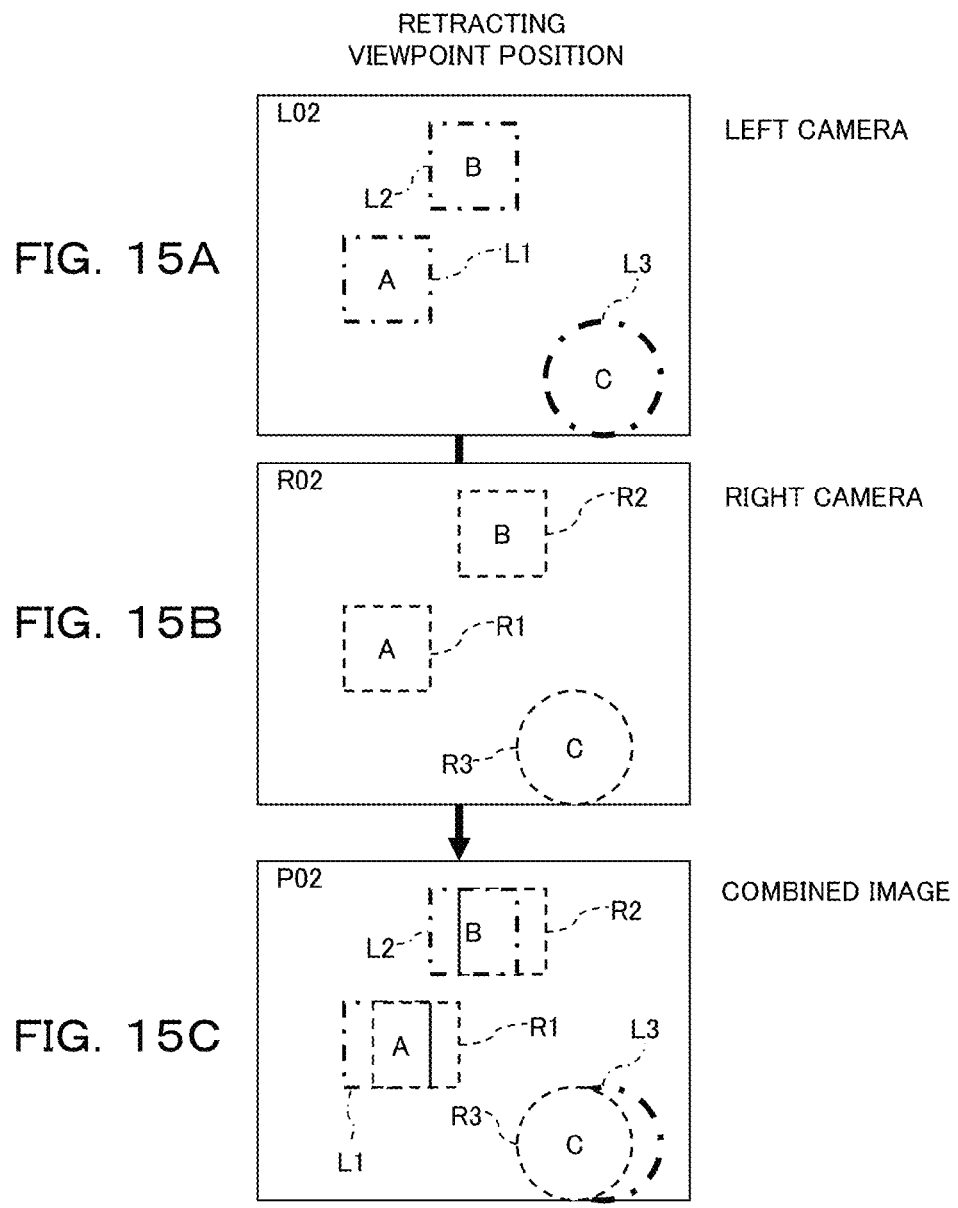

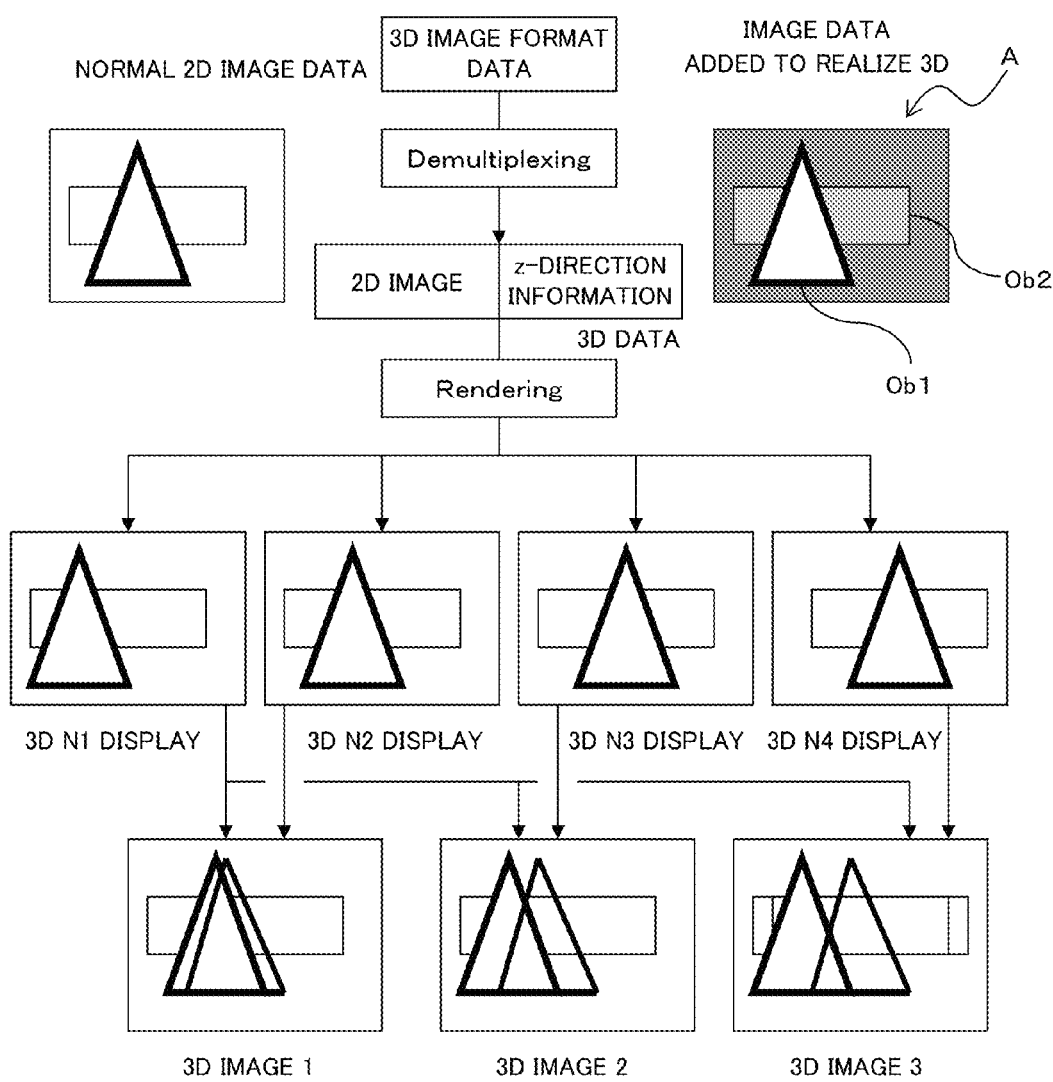

FIG. 19A

| L4RN1 | L3GN1 | L2BN1 | L3RN1 |
|---|---|---|---|
| L3RN1 | L4GN1 | L1BN1 | L2RN1 |
| L2RN1 | L3GN1 | L4BN1 | L1RN1 |
| L1RN1 | L2GN1 | L3BN1 | L4RN1 |

LEFT EYE

FIG. 19B

| R4RN1 | R3GN1 | R2BN1 | R1RN1 |
|---|---|---|---|
| R3RN1 | R4GN2 | R1BN1 | R6RN1 |
| R2RN1 | R3GN1 | R4BN2 | R5RN1 |
| R1RN1 | R2GN1 | R3BN1 | R4RN2 |

RIGHT EYE

2D DISPLAY STATE EXAMPLE
OF LIQUID CRYSTAL DISPLAY

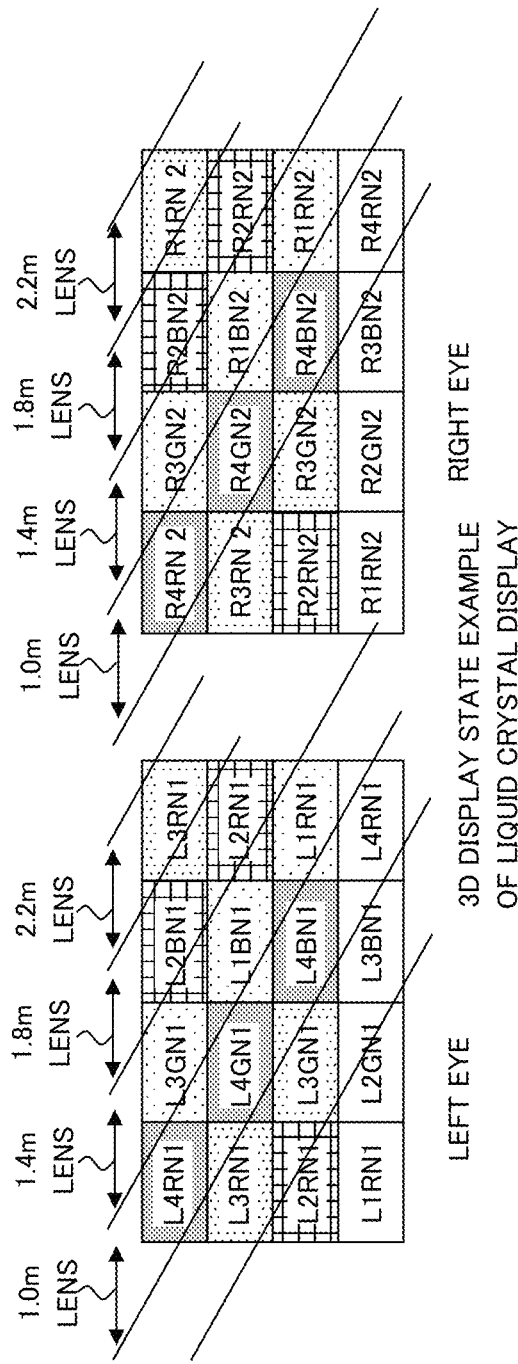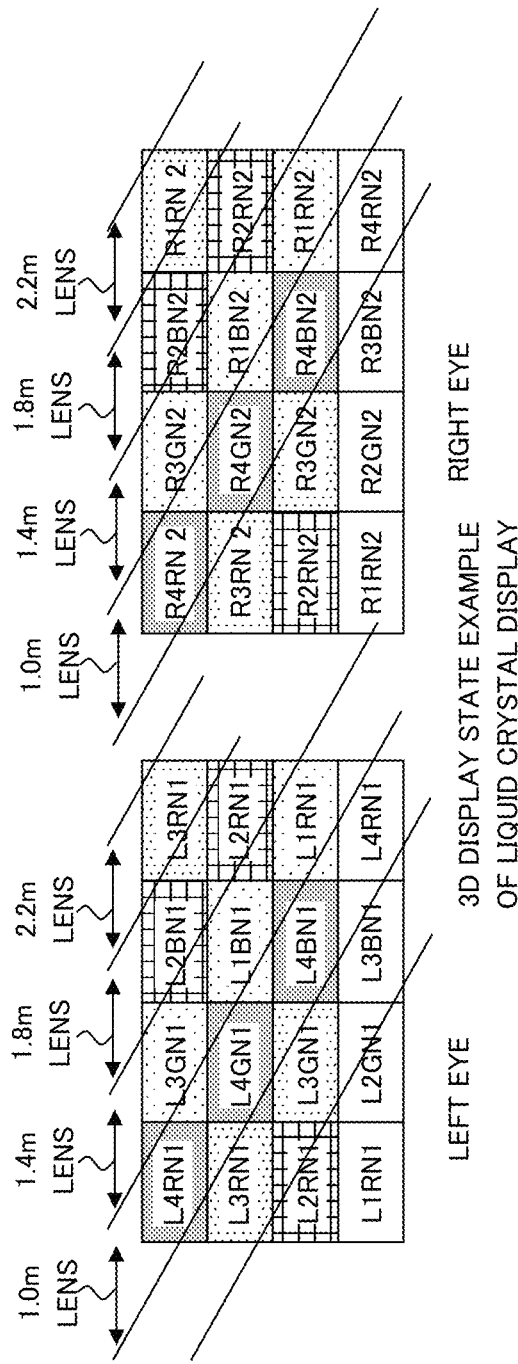

STEREOSCOPIC IMAGE DISPLAY APPARATUS AND COMPUTER-READABLE RECORDING MEDIUM STORING PROGRAM THEREON

CROSS-REFERENCE TO RELATED APPLICATION

This application is a continuation application of International Application PCT/JP2012/055750, filed on Mar. 7, 2012 and designated the U.S., the entire contents of which are incorporated herein by reference.

FIELD

The present invention discussed herein is related to a stereoscopic image display apparatus and a computer-readable recording medium storing a program thereon.

BACKGROUND

A stereoscopic image generating apparatus that generates stereoscopic images using a parallax of images captured by two adjacent cameras is known. The stereoscopic image generating apparatus generates an image captured by one camera as a left-eye image and an image captured by the other camera as a right-eye image among the images captured by two adjacent cameras and displays the left and right-eye images.

A difference between the positions of the same object in the left and right-eye images is referred to as a parallax or a binocular parallax. When two objects present in an image have different parallax amounts, one object appears to be present in front of or behind the other object. The parallax amount is the magnitude of a binocular parallax.

Moreover, in the stereoscopic image generating apparatus, a lenticular lens may be provided in a display device such as a liquid crystal display so that different images are recognized on the left and right eyes without using dedicated glasses. Specifically, a sheet-shaped lenticular lens formed by successively arranging semicylindrical convex lenses is disposed between the display device and a viewer.

That is, a left-eye image and a right-eye image are alternately displayed on the display device, and the images are viewed through the lenticular lens, whereby only the left-eye image is seen on the left eye and only the right-eye image is seen on the right eye, and the images are recognized as a stereoscopic image.

CITATION LIST

Patent Literature

Patent Literature 1: Japanese Laid-open Patent Publication No. 04-035192

In the conventional stereoscopic image generating apparatus, it is desirable to allow the viewer to see stereoscopic images more efficiently.

SUMMARY

According to an aspect of the present invention, there is provided a stereoscopic image display apparatus including: a distance measuring unit that measures a distance to a viewer; a selecting unit that selects parallax images having a binocular parallax amount corresponding to the measured distance to the viewer from parallax images of a display object based on the measured distance to the viewer as a stereoscopic image pair; and a display control unit that causes a display unit to display the selected stereoscopic display image pair.

According to another aspect of the present invention, there is provided a computer-readable recording medium storing a program for causing a computer to execute an image display control function of displaying an image on a display screen of a display device, the program causing the computer to execute processes of: measuring a distance to a viewer; selecting parallax images having a binocular parallax amount corresponding to the measured distance to the viewer from parallax images of a display object based on the measured distance to the viewer as a stereoscopic image pair; and causing a display unit to display the selected stereoscopic display image pair.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 is a diagram for describing a positional relationship between a camera pair and an imaging object of the stereoscopic image display apparatus which is an example of the first embodiment.

FIGS. 14A, 14B, and 14C are diagrams illustrating the relationship between an object position and an object image captured by a camera pair.

FIGS. 15A, 15B, and 15C are diagrams illustrating the relationship between an object position and an object image captured by a camera pair.

FIGS. 18A, 18B, and 18C are diagrams for describing a stereoscopic display image used in the stereoscopic image display apparatus which is an example of the first embodiment.

FIGS. 19A and 19B are diagrams illustrating examples of the display state of a display surface of the stereoscopic image display apparatus which is an example of the embodiment.

FIGS. 20A and 20B are diagrams illustrating examples of the display state of a display surface of the stereoscopic image display apparatus which is an example of the embodiment.

DESCRIPTION OF EMBODIMENT(S)

Figure 1:
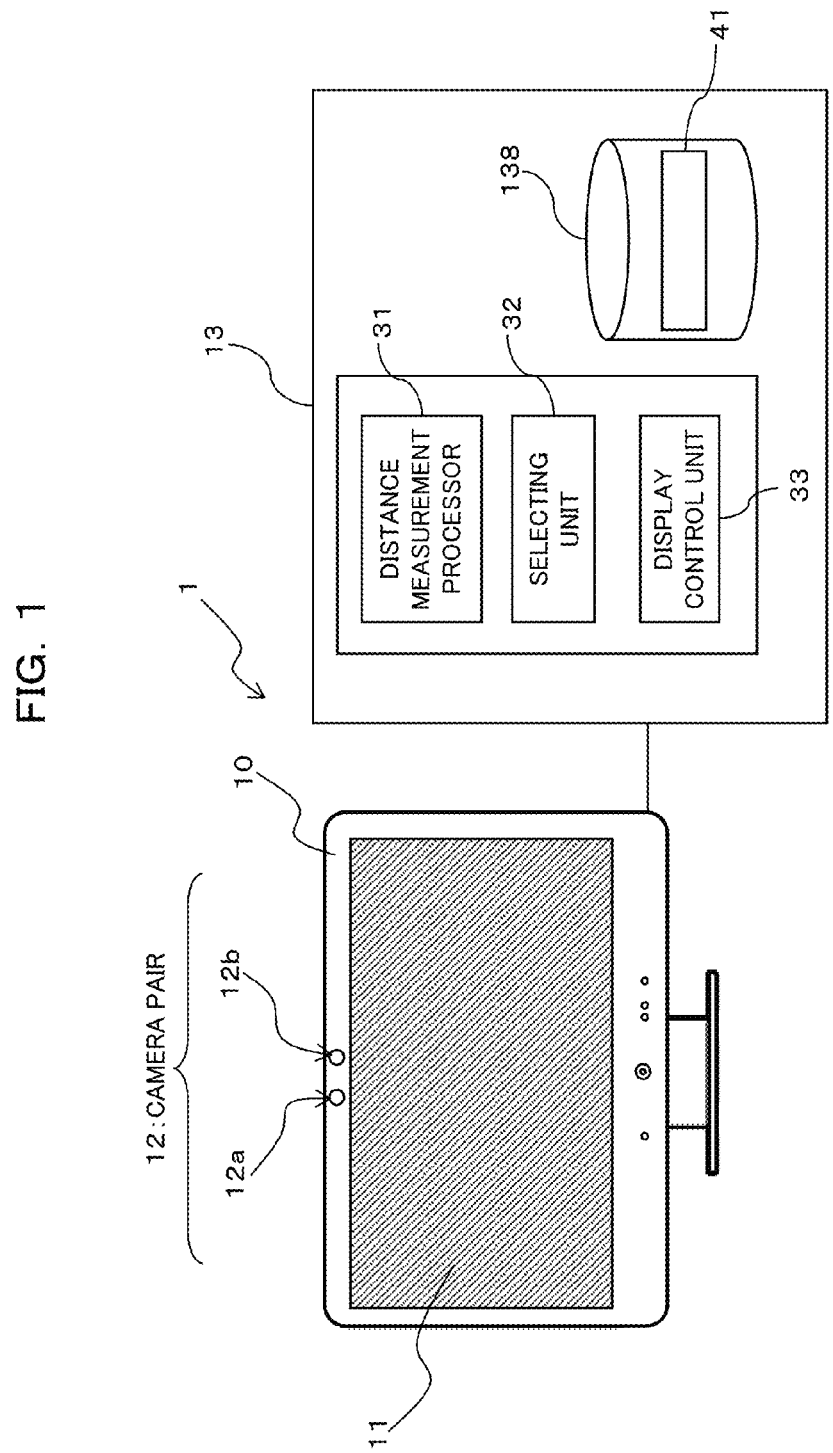
FIG. 1 is a diagram schematically illustrating a configuration of a stereoscopic image display apparatus which is an example of a first embodiment.

Hereinafter, embodiments of the present invention will be described based on the drawings. The embodiments illustrated below are examples only, and the present invention is intended to cover various modifications and techniques which are not disclosed in the embodiments. That is, the present embodiment can be modified in various forms (for example, embodiments and modifications may be combined) without departing from the spirit thereof. The present invention may include other functions in addition to the constituent elements illustrated in the drawings.

(A) First Embodiment

Figure 2:
FIG. 2 is a diagram illustrating an example of an arrangement of display elements of a display device of the stereoscopic image display apparatus which is an example of the first embodiment.

FIG. 1 is a diagram schematically illustrating a configuration of a stereoscopic image display apparatus 1 which is an example of a first embodiment, and FIG. 2 is a diagram illustrating an example of an arrangement of display elements of a display device 10 thereof.

Figure 23:
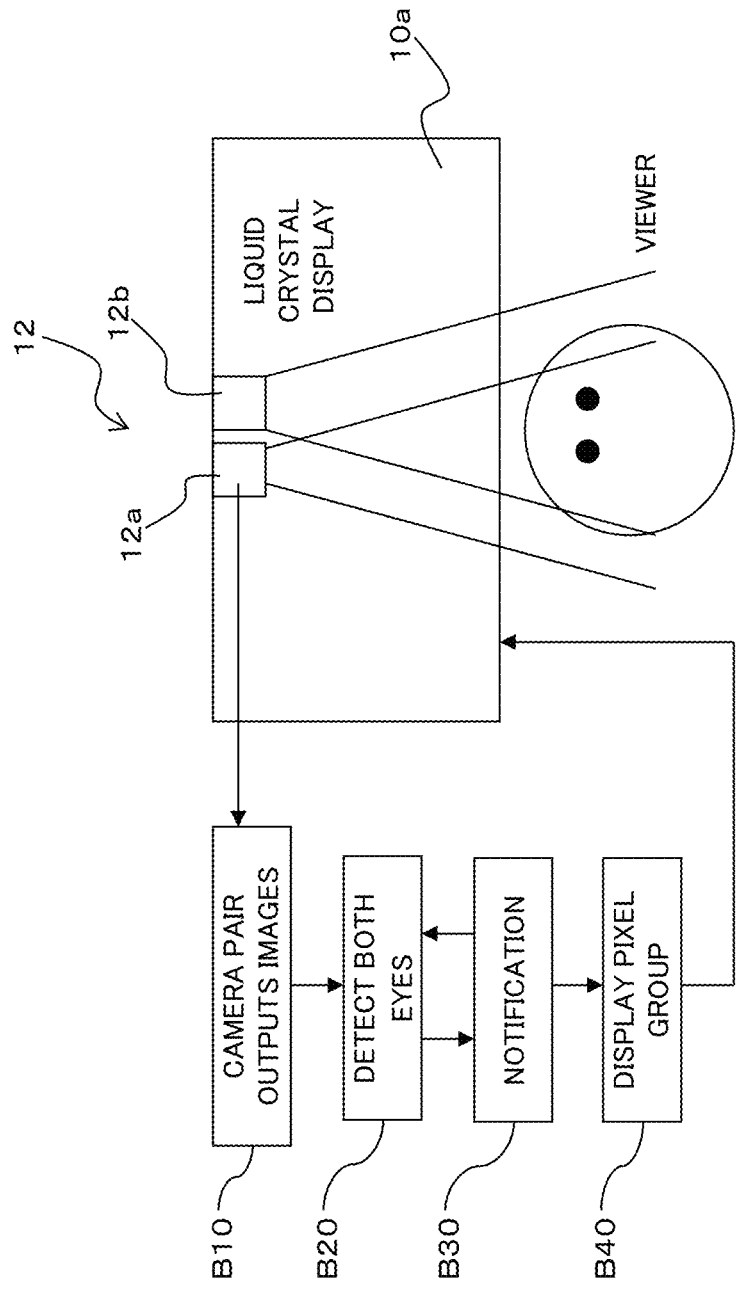
FIG. 23 is a diagram for describing an outline of a stereoscopic image display method in the stereoscopic image display apparatus which is an example of the first embodiment.

In the stereoscopic image display apparatus 1 of the first embodiment, a viewer is positioned to face a display device 10 having a lens sheet 11 attached to a display surface 10a (see FIG. 10), and a stereoscopic image is displayed on the display surface 10a (see FIG. 23). In this way, the stereoscopic image is seen on the left and right eyes of the viewer with the lens sheet 11 interposed, and a stereoscopic image of a display object is viewed.

That is, the stereoscopic image display apparatus 1 which is an example of the first embodiment is a lens-type stereoscopic image display apparatus that allows the viewer to experience stereoscopic vision with the aid of the lens sheet 11.

The stereoscopic image (3D image) is an image captured by two adjacent cameras, for example, and an image captured by one of the two cameras is used as a left-eye image and an image captured by the other camera is used as a right-eye image. The stereoscopic image includes the left-eye image and the right-eye image. Such two images having a binocular parallax allow stereoscopic vision. The stereoscopic image can be created using various existing methods and the detailed description thereof will not be provided. Moreover, the stereoscopic image displayed by the stereoscopic image display apparatus 1 may be a moving image or a still image.

As illustrated in FIG. 1, the stereoscopic image display apparatus 1 which is an example of the embodiment includes a display device 10, a lens sheet 11, a camera pair 12, and a display control device 13.

The display device 10 is a liquid crystal display, for example, and displays an image on the display surface 10a according to the control from the display control device 13. That is, in the stereoscopic image display apparatus 1, the stereoscopic image is displayed on the display device 10. Hereinafter, the display device 10 will be described by way of an example of the liquid crystal display.

The display surface 10a of the display device 10 is formed as a flat surface, and a plurality of color pixel elements (display elements) is arranged on the display surface 10a in a horizontal direction (the horizontal direction of FIG. 2; an arrangement direction) of the display surface 10a and a vertical direction (the vertical direction of FIG. 2) perpendicular to the horizontal direction. That is, on the display surface 10a of the display device 10, the display elements are arranged in the arrangement direction and in the direction perpendicular to the arrangement direction, whereby the display elements are arranged in a matrix form.

The plurality of pixels that forms an image (stereoscopic image) displayed on the display surface 10a is represented by display elements.

Specifically, each pixel includes a plurality of color pixels. Examples of the color pixels include color pixels that form three primary colors of light of red (R), green (G), and blue (B). In the display surface 10a, as illustrated in FIG. 2, the display elements of these color pixels are repeatedly arranged in a predetermined order in the arrangement direction. Moreover, the display elements of the same types are successively arranged in the direction perpendicular to the arrangement direction. A black matrix may be disposed at the boundary between the display elements. In the display surface 10a, one pixel is represented by the display elements of the three successive color pixels R, G, and B.

Moreover, in the first embodiment, the display elements of the respective color pixels are rectangular display elements in which a light-emitting portion has a rectangular shape.

In the stereoscopic image display apparatus 1, the display elements of three color pixels of the colors R, G, and B arranged in an oblique direction (non-parallel direction) with respect to the vertical direction of the arrangement of the display elements of the display surface 10a as illustrated in FIG. 2 form one pixel. That is, one pixel is disposed in the oblique direction.

For example, in the example illustrated in FIG. 2, R1, G1, and B1 which are display elements of the color pixels form one pixel (pixel L1). The same is true for the display elements of the other color pixels.

In the example illustrated in FIG. 2, although the color pixels of one pixel are disposed in non-parallel to the arrangement direction (the horizontal direction in the present embodiment) of pixels, the present invention is not limited to this but may be modified in various forms. The color pixels of one pixel may be disposed in parallel to the arrangement direction of pixels.

Figure 3:
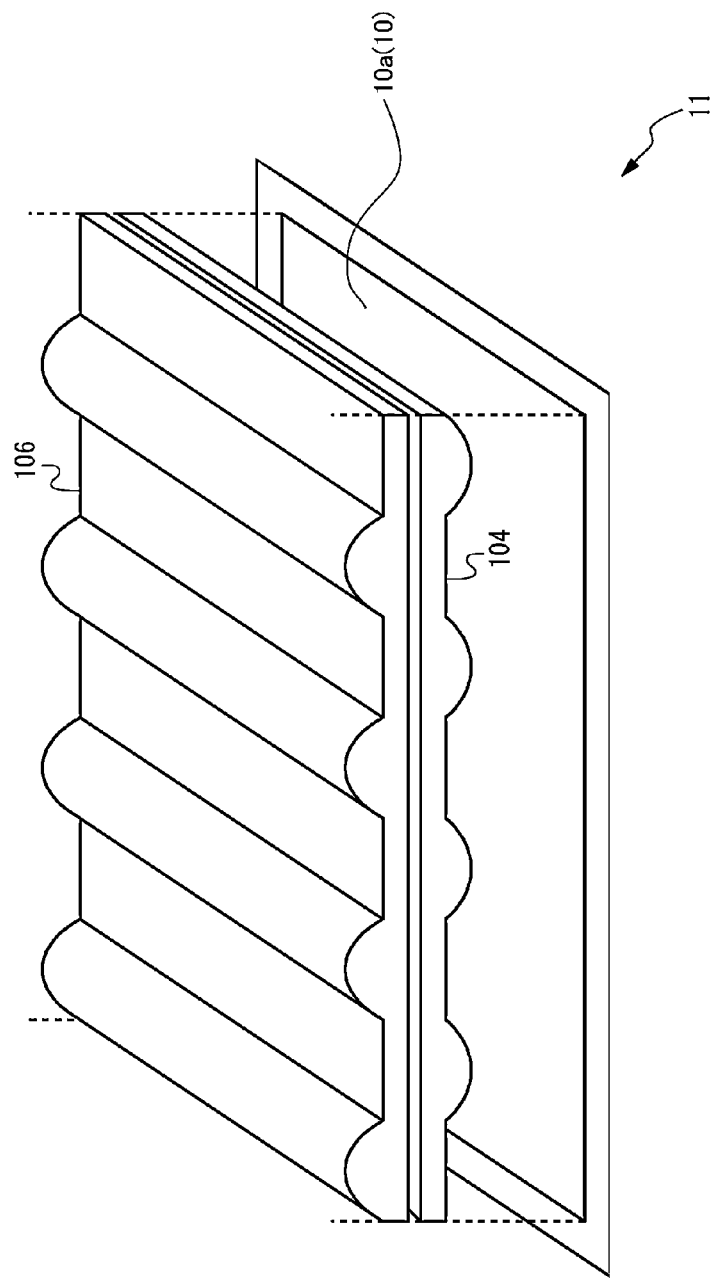
FIG. 3 is a diagram illustrating a configuration example of a lens sheet of the stereoscopic image display apparatus which is an example of the first embodiment.

FIG. 3 is a diagram illustrating a configuration example of the lens sheet 11 of the stereoscopic image display apparatus 1 which is an example of the first embodiment.

The lens sheet 11 includes a plurality of (two in the example illustrated in FIG. 3) optical units 104 and 106 and is disposed so as to face the display surface 10a of the display device 10. Hereinafter, the optical unit 104 is sometimes referred to as a first optical unit 104 and the optical unit 106 is sometimes referred to as a second optical unit 106. As illustrated in FIG. 3, the display surface 10a and the optical units 104 and 106 are disposed approximately in parallel and are arranged in the order of the display surface 10a, the first optical unit 104, and the second optical unit 106.

The first optical unit 104 is a lenticular-shaped lens (lenticular lens) that includes a plurality of first semicylindrical lenses (lens array) and planar portions on a surface facing the display device 10. The outer surface (the surface opposite to the surface facing the display device 10) of the first optical unit 104 is a flat surface. The outer surface of the first optical unit 104 may be in contact with the second optical unit 106. The first lens and the planar portion are disposed obliquely to the pixel arrangement (the arrangement of display elements) on the display surface 10a of the display device 10.

Specifically, the first lens is disposed in parallel to three display elements (oblique display element groups) positioned in an oblique direction, forming one pixel of the display device 10 so that a base line overlaps these oblique display element groups.

The second optical unit 106 is a lenticular lens that includes a plurality of second semicylindrical lenses (lens array) and planar portions on the surface opposite to the surface facing the display device 10. The outer surface (the surface facing the display device 10) of the second optical unit 106 is a plane. The second lens and the planar portion are disposed obliquely to the pixel arrangement on the display surface 10a of the display device 10. That is, the second lens is disposed in parallel to oblique display element groups of the display device 10 so that a base line overlaps these oblique display element groups.

The entire surfaces of the first optical unit 104 and the second optical unit 106 may be protected by a transparent flat plate. The lenses used in the first optical unit 104 and the second optical unit 106 are semicylindrical curved lenses. The lenses of the first optical unit 104 and the second optical unit 106 are convex portions of the first optical unit 104 and the second optical unit 106. The semicylindrical curved lens has a solid shape obtained when one of portions surrounded by a closed curve (for example, an ellipse) on a plane and a straight line cutting the plane is scanned in a direction normal to the plane, for example. The semicylindrical curved lens may have a solid shape of one of the solids obtained when a circular column (or an elliptical column) is cut along a plane parallel to a straight line in the height direction of the circular column (elliptical column). Moreover, the first optical unit 104 and the second optical unit 106 may be integrated and may be separated.

In the lens sheet 11, the first lens of the first optical unit 104 and the second lens of the second optical unit 106 have different focal distances. In this way, the lens sheet 11 can form the image projected on the display surface 10a of the display device 10 at a plurality of positions at which the distances from the display surface 10a are different.

Figure 4:
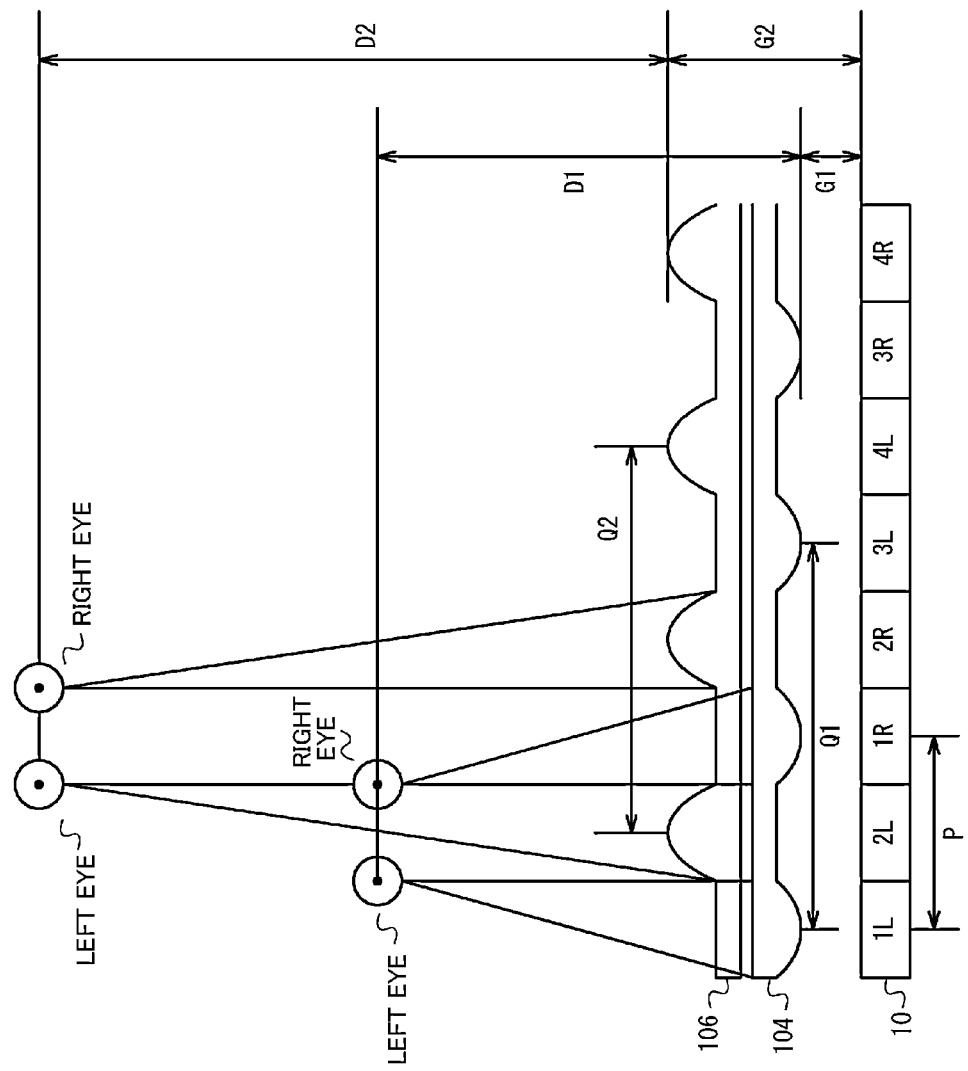
FIG. 4 is a diagram illustrating a cross-section of the lens sheet of the stereoscopic image display apparatus which is an example of the first embodiment.

FIG. 4 is a diagram illustrating a cross-section of the lens sheet 11 of the stereoscopic image display apparatus 1 which is an example of the first embodiment. As illustrated in FIG. 4, the distance between the display device 10 and the principal point of the first lens of the first optical unit 104 is defined as G1, and the distance between the display device 10 and the exit point of the second lens of the second optical unit 106 is defined as G2. Moreover, the distance between the principal point of the first lens and the position at which the image of the display device 10 is imaged through the first lens is defined as D1, and the distance between the principal point of the second lens and the position at which the image of the display device 10 is imaged through the second lens is defined as D2. The focal distance of the first lens is defined as f1, and the focal distance of the second lens is defined as f2. The focal distance of the lens is calculated from a material and the radius of curvature of the lens.

As illustrated in FIG. 4, the first lens of the first optical unit 104 and the planar portion of the second optical unit 106 are disposed so as to approximately overlap. Light coming from the display device 10 reaches the eyes of the viewer after passing through the first lens of the first optical unit 104 and the planar portion of the second optical unit 106. Similarly, the planar portion of the first optical unit 104 and the second lens of the second optical unit 106 are disposed so as to approximately overlap. Light coming from the display device 10 reaches the eyes of the viewer after passing through the planar portion of the first optical unit 104 and the second lens of the second optical unit 106. Since light passing through the first lens of the first optical unit 104 passes through the planar portion of the second optical unit 106, the light is not influenced by the second lens of the second optical unit 106. Moreover, since light passing through the second lens of the second optical unit 106 passes through the planar portion of the first optical unit 104, the light is not influenced by the first lens of the first optical unit 104.

As illustrated in FIG. 4, the images (pixels) 1L and 3L of the display device 10 enter the left eye of the viewer present at a position at which the image of the display device 10 is imaged through the first lens. Moreover, the images of the pixels 1R and 3R of the display device 10 enter the right eye of the viewer present at a position at which the image of the display device 10 is imaged through the first lens. Similarly, the images of the pixels 2L and 4L of the display device 10 enter the left eye of the user present at a position at which the image of the display device 10 is imaged through the second lens. Moreover, the images of the pixels 2R and 4R of the display device 10 enter the right eye of the viewer present at a position at which the image of the display device 10 is imaged through the second lens. The same is true for the depth direction and the left-right direction of FIG. 4.

The respective pixels 1L and 2L, 1R and 2R, 3L and 3L, and 3R and 4R may be the same. That is, for example, the pixels 1L and 2L may be the same.

From the lens formula, the distances D1, G1, and f1 satisfy the following equation.

$$1/D1+1/G1=1/f1$$

The distances D2, G2, and f2 satisfy the same equation. Thus, by adjusting the distances G1, G2, f1, and f2, it is possible to determine the distances D1 and D2 which are the viewer position.

The sum of the distances D1 and G1 is set to be different from the sum of the distances D2 and G2. By setting in this manner, the viewer can view the stereoscopic image displayed on the display device 10 at a plurality of positions. The sum of the distances D1 and G1 is the distance between the display surface 10a of the display device 10 and the viewer who views the stereoscopic image through the first lens. The sum of the distances D2 and G2 is the distance between the display surface 10a of the display device 10 and the viewer who views the stereoscopic image through the second lens.

The interval of the respective first lenses of the first optical unit is determined by the following equation. Here, as illustrated in FIG. 4, the distance between the first lens on which light from the pixel 1L is incident and the first lens on which light from the pixel 3L is incident is defined as Q1. The distance between the first lens on which light from the pixel 1L is incident and the first lens on which light from the pixel 1R is incident is half the distance Q1.

The distance between the first lens on which light from the pixel 2L is incident and the second lens on which light from the pixel 4L is incident is defined as Q2. The distance between the second lens on which light from the pixel 2L is incident and the second lens on which light from the pixel 2R is incident is half the distance Q2. Moreover, the distance between the pixels 1L and 1R of the display device 10 is defined as P. The distance between the pixels 1L and 2L of the display device 10 is half the distance P.

$$2P \times D1 = Q1(D1+G1)$$

$$2P \times D2 = Q2(D2+G2)$$

Figure 5:
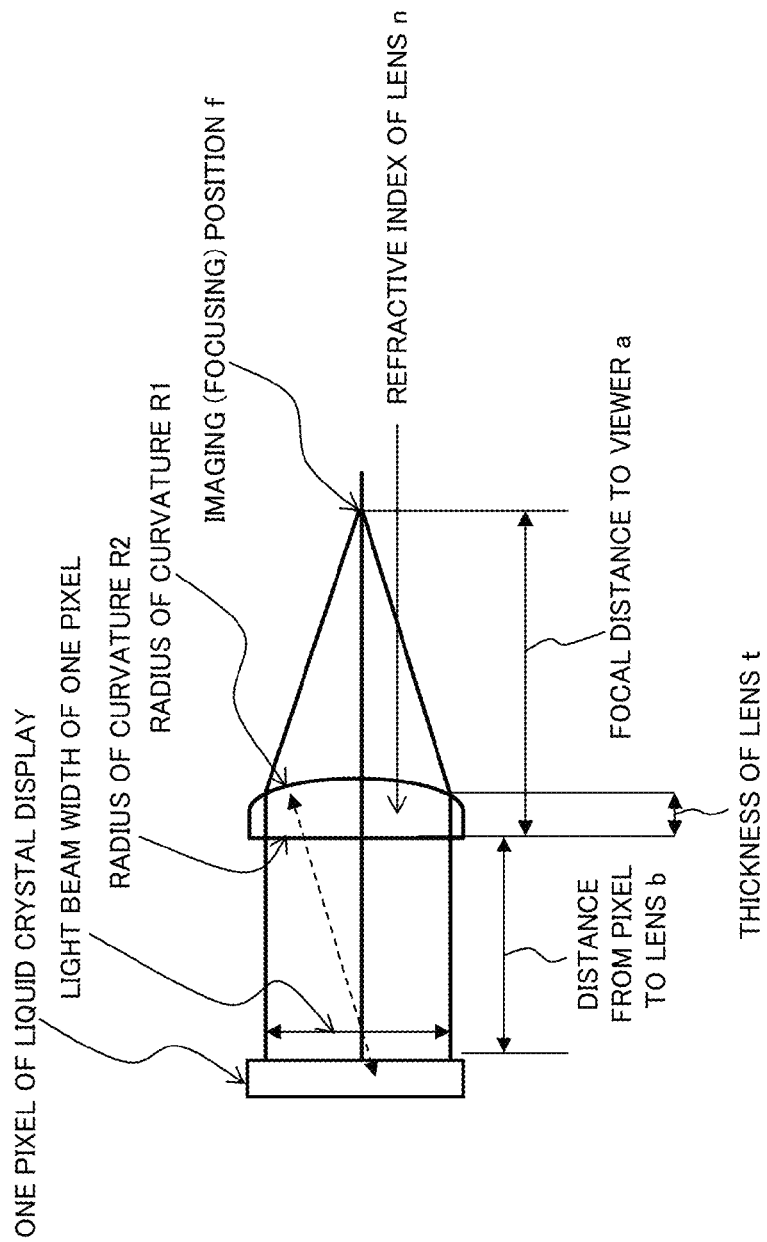
FIG. 5 is a diagram for describing an imaging distance of the lens sheet.

Here, the imaging (focal) distance of a lens will be described with reference to FIG. 5. First, the focal distance of a general convex lens is defined by the following formula.

$$1/f=(n-1)(1/r1-1/r2)+(n-1)\times(n-1)/n \times t/r1r2$$

where f: focal distance n: refractive index of lens r1: radius of curvature on pixel side r2: radius of curvature on viewer side t: lens thickness Here, since the lens is a semicylindrical plano-convex lens, "r2" is infinite, and "1/r2" becomes zero.

Moreover, since "r2" is infinite, "t/r1r2" also becomes zero. Thus, the above equation becomes the following equation.

$$1/f=(n-1)(1/r1)$$

Here, "n" is a fixed value determined by the material of the lens. Thus, "f" is determined by "r1".

Since the focal distance (that is, the position at which the respective pixels R, G, and B are imaged) is the distance "a" from the lens and the viewer, f=a.

Thus, the position at which the viewer can view a 3D image is "f", and the value of "f" is determined by "r1". Moreover, the value of "r1" depends on the distance "b" between the pixel and the lens.

Figure 6:
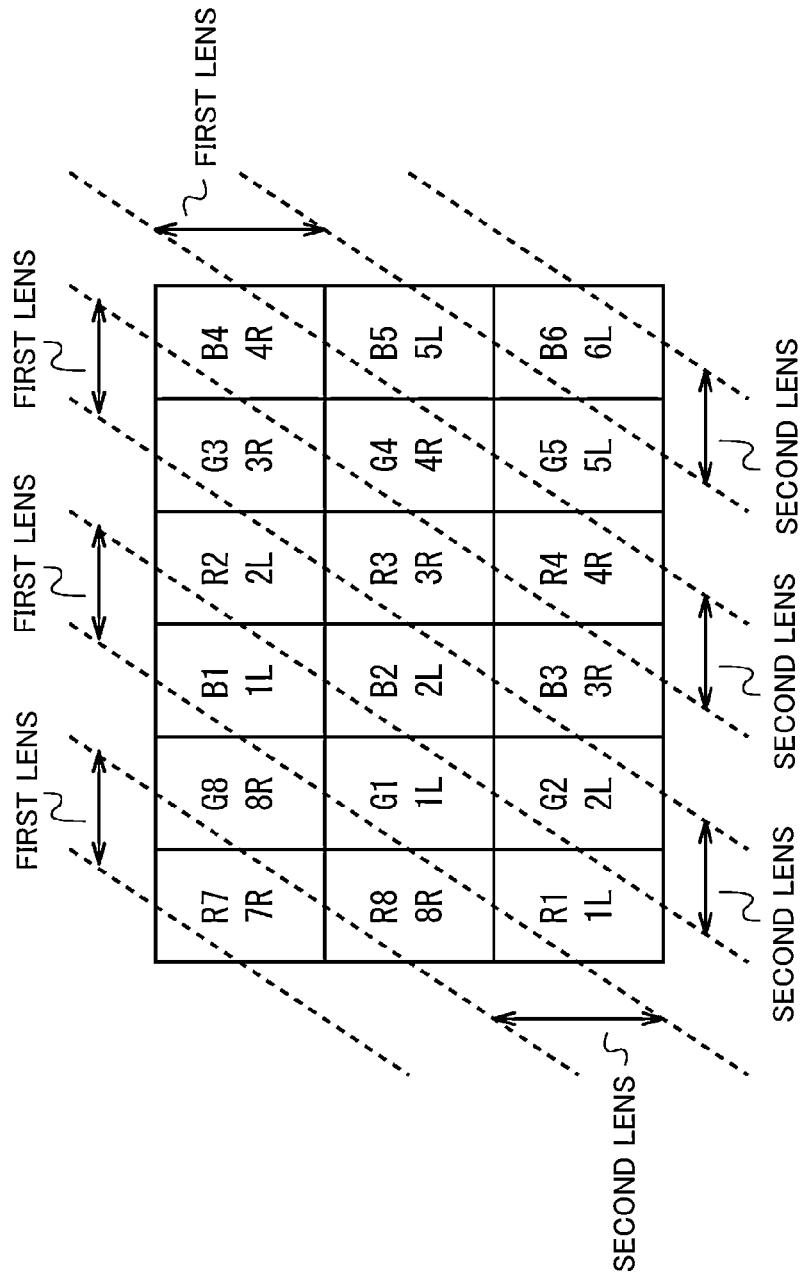
FIG. 6 is a diagram illustrating an arrangement of a first lens and a second lens of the lens sheet and pixels on a display surface of the stereoscopic image display apparatus which is an example of the first embodiment.

FIG. 6 is a diagram illustrating an arrangement of the first lens, the second lens, and the pixels on the display surface 10a of the display device 10. The pixels illustrated in FIG. 6 are part of the pixels on the display surface 10a of the display device 10. Each pixel (1L, 2L, or the like) has color pixels of the colors R, G, and B. For example, the pixels R1, G1, and B1 of FIG. 6 form one pixel (1L). A left-eye image is displayed by the pixels 1L, 2L, and the like. The pixels 1L, 2L, and the like are left-eye pixels. Similarly, a right-eye pixel is displayed by the pixels 1R, 2R, and the like. The pixels 1R, 2R, and the like are right-eye pixels.

In the display surface 10a, pixels of left-eye image are displayed in the display elements used for displaying the left-eye images. Moreover, pixels of right-eye images are displayed in the display elements used for displaying the right-eye images.

The first lens and the second lens are disposed in an oblique direction (non-parallel direction) with respect to the vertical direction of the arrangement of the display elements of the display device 10. The first lens and the second lens are disposed in parallel to the direction of the other lens. In line with this, in the pixels displayed by the display device 10, color pixels are arranged in the oblique direction. That is, one pixel is disposed in the oblique direction. For example, the color pixels R1, G1, and B1 form one pixel. The same is true for the other color pixels.

The directions of the first and second lenses are parallel to the three display elements (oblique display element groups) positioned in the oblique direction, forming one pixel, and thus, the direction of the color pixels of each pixel is parallel to the direction of the lenses.

For example, light coming from the pixels 1L and 1R enters the first lens. Light coming from the pixels 2L and 2R enters the second lens. The respective pixels are formed by the display elements of the display surface 10a of the display device 10. The display control device 13 described later performs emission control of the respective display elements provided in the display surface 10a of the display device 10.

Figure 7:
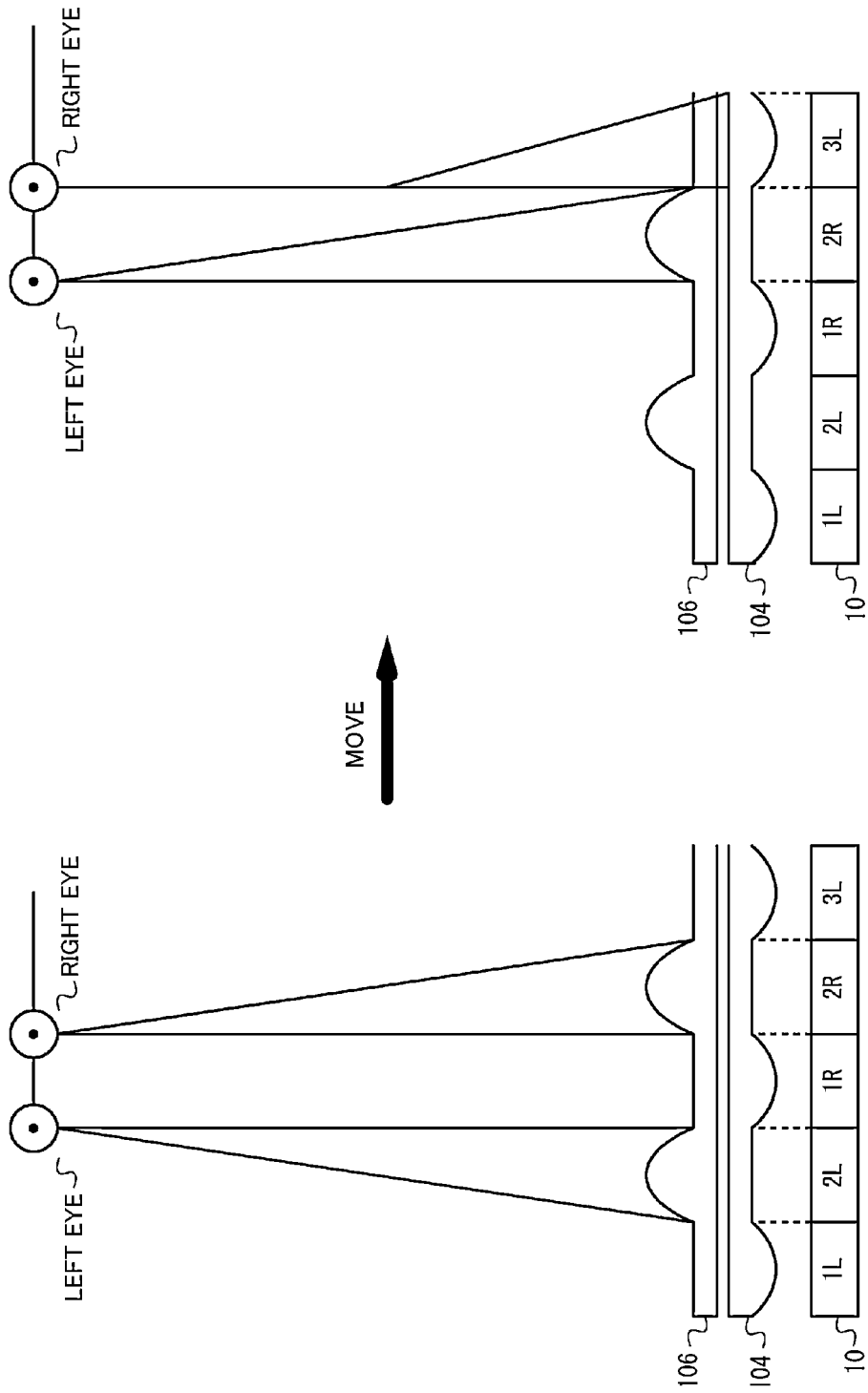
FIG. 7 is a diagram illustrating an example where a viewpoint has moved.

FIG. 7 is a diagram illustrating an example when a viewpoint has moved. On the left side of FIG. 7, the viewer is at a position where the images of the pixels 2L and 2R are imaged on the left and right eyes, and the image of the pixel 2L is seen on the left eye and the image of the pixel 2R is seen on the right eye. As a result, the viewer can view a stereoscopic image by seeing the left-eye image with the left eye and the right-eye image with the right eye.

Here, it is assumed that the viewer has moved slightly to the right as illustrated on the right side of FIG. 7. In this case, the left eye of the viewer is at a position where the image from the pixel 2R, which is the right-eye image, is imaged. Thus, the right-eye image is viewed on the left eye of the viewer. On the other hand, the right eye of the viewer is not at a position where any one of the images from the display device 10 is not imaged. For example, since the image from the pixel 3L is imaged in front of the viewer, the image cannot be viewed on the right eye of the viewer. Only a blurring image is viewed on the right eye of the viewer. Thus, the viewer can view the stereoscopic image with both eyes by moving toward the left or right side. Therefore, the viewer does not view the stereoscopic image in a reverse viewing state. The reverse viewing state is a state where the viewer views the right-eye image with the left eye and the left-eye image with the right eye.

In the stereoscopic image display apparatus 1, a plurality of (two in the example illustrated in FIG. 2) optical units 104 and 106 is provided as described above. Since the plurality of optical units 104 and 106 is stacked, the image displayed on the display device 10 is imaged at a plurality of (two in the example illustrated in FIG. 2) distances from the display surface 10a of the display device 10. As a result, the viewer of the stereoscopic image display apparatus 1 can view the stereoscopic image displayed on the display device 10 from a plurality of (two in the example illustrated in FIG. 2) positions.

Since the stereoscopic image display apparatus 1 has front and rear imaging points in relation to the display device 10, even when the user viewing the stereoscopic image at any one of the imaging points moves to the left or right side, the reverse viewing state can be prevented.

Since the stereoscopic image display apparatus 1 includes the first optical unit 104 having the first lens on the inner side (the display device 10 side) and the second optical unit 106 having the second lens on the outer side (the side opposite the side facing the display device 10), it is possible to make the distances (G1 and G2) between the respective lenses and the display device 10 different greatly. That is, it is possible to increase the difference between the distances G1 and G2. Due to this, the stereoscopic image display apparatus 1 can make the positions (the sum of the distances G1 and D1 and the sum of the distances G2 and D2) at which images are imaged through the respective lenses different greatly.

Moreover, the configuration of the lens sheet 11 is not limited to the above-described example but can be modified in various manners. Some features of the modifications illustrated below are the same as those of the embodiment described above. Thus, the differences will be mainly described, and the description of the same features will not be provided.

Figure 8:
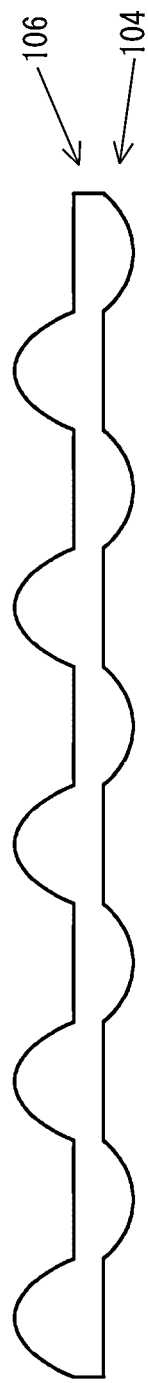
FIG. 8 is a diagram illustrating a modification of a first optical unit and a second optical unit.

FIG. 8 is a diagram illustrating a modification of the first optical unit and the second optical unit. In the embodiment described above, the first optical unit 104 and the second optical unit 106 are separated. However, in the example of FIG. 8, the first optical unit 104 and the second optical unit 106 are combined to form one optical unit. By forming the optical unit in this manner, it is possible to decrease the number of components.

Figure 9:
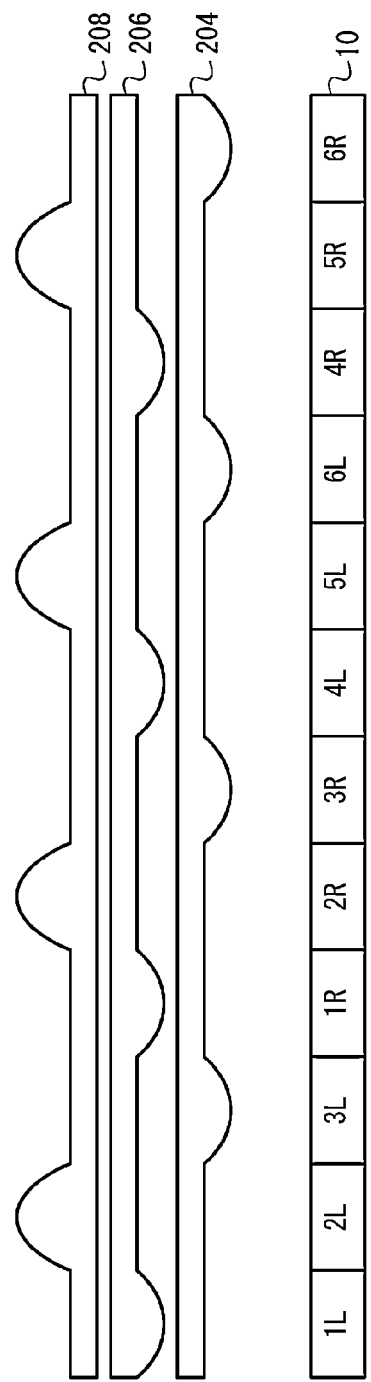
FIG. 9 is a diagram illustrating a modification of an optical unit and a display device.

FIG. 9 is a diagram illustrating a modification of the optical unit and the display device. In the example of FIG. 9, the lens sheet 11 includes a first optical unit 204, a second optical unit 206, and a third optical unit 208. That is, the lens sheet 11 includes three optical units.

The first optical unit 204, the second optical unit 206, and the third optical unit 208 have the same configuration as the first optical unit 104 and the second optical unit 106.

Moreover, in the example illustrated in FIG. 9, although the lens sheet 11 includes three optical units, the present invention is not limited to this, and the lens sheet 11 may include four or more optical units. Since an apparatus having this configuration includes a plurality of (n) optical units, the apparatus can form the image from the display surface 10a at a plurality of (n) distances (imaging positions) from the display surface 10a of the display device. The number of optical units is sometimes referred to as the number of imaging points.

In this modification, each optical unit has a planar portion that prevents light having passed through the lenses of the other optical units from passing through the subject lens. In each optical unit, the interval of the lenses (that is, the width of the planar portion) is preferably approximately the same as a multiplication of (n−1) and a lens width. Thus, each optical unit of this modification has a larger planar portion than the planar portion of the optical unit of the above-described embodiment.

The lenses of each optical unit may be present on the display device 10 side and may be present on the side opposite the side facing the display device 10. Due to the optical structure, the focal distance of the lens array changes depending on the distance between an emitting pixel and a curved surface of the lens array. Thus, there is no influence on the image formed regardless of whether the curved lens surface is present on the display device 10 side or on the viewer side.

As described above, in the stereoscopic image display apparatus 1, it is possible to allow the stereoscopic image to be imaged on the eyes of the viewer at a plurality of positions at which the distances from the display surface 10a of the display device 10 are different.

The light beams output from the respective display pixels of the display surface 10a are imaged at the focal distance corresponding to the configuration of the optical unit of the lens sheet 11 disposed so as to face the display pixels. That is, the respective display pixels of the display surface 10a are specified for displaying of any one of the pixels of the right-eye image or the left-eye image and are specified for imaging at any one of the plurality of focal distances of the lens sheet 11.

That is, the respective display pixels of the display surface 10a are correlated in advance with any one of the right-eye image or the left-eye image and are also correlated with any one of the plurality of focal distances of the lens sheet 11. Hereinafter, a display element used for displaying the right-eye image will be referred to as a right-eye display element and a display element used for displaying the left-eye image will be referred to as a left-eye display element.

Figure 10:
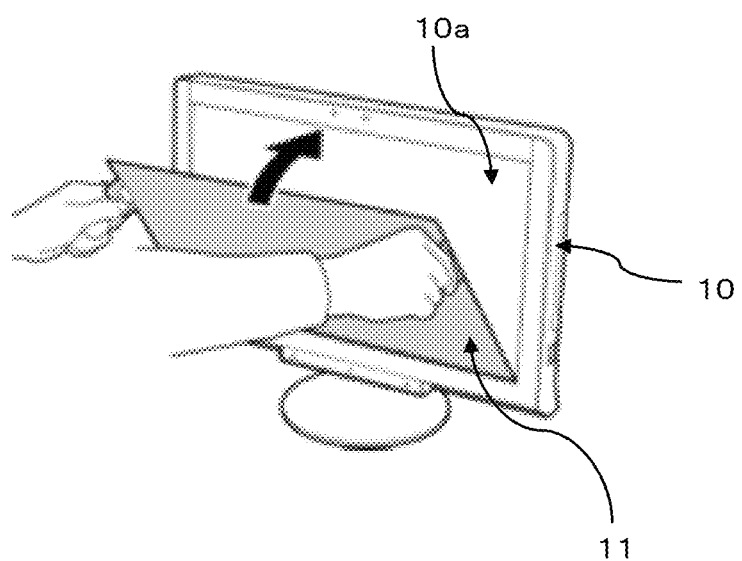
FIG. 10 is a diagram illustrating an example of attachment of a lens sheet to the display device of the stereoscopic image display apparatus which is an example of the first embodiment.

FIG. 10 is a diagram illustrating an example of attachment of a lens sheet to the display device of the stereoscopic image display apparatus which is an example of the first embodiment.

As illustrated in FIG. 10, the lens sheet 11 is fixed and attached to a predetermined position on the front side (the viewer side) of the display surface 10a of the display device 10. The lens sheet 11 is fixed to the display device 10 by fixing the same to hooks (not illustrated) or the like, for example. Moreover, a sensor (not illustrated) that detects attachment of the lens sheet 11 is provided in the display device 10, and information indicating whether the lens sheet 11 is attached is sent to the display control device 13.

Further, the lens sheet 11 has 3D panel ID (identification information) for identifying the type or the like of the lens sheet 11. The lens sheet 11 is sometimes referred to as a 3D panel.

For example, a noncontact ID tag storing the 3D panel ID is provided in the lens sheet 11, and an ID tag reader is provided in the display device 10. Due to this, the display device 10 can acquire the 3D panel ID. Moreover, the display device 10 transmits the acquired 3D panel ID to the display control device 13.

In the stereoscopic image display apparatus 1, since one pixel of the display surface 10a corresponds to one lens array (one lens), a light beam of one pixel can be imaged at an accurate focal distance "a" without decreasing the intensity (amount) of light.

The camera pair 12 is an imaging device (image capturing unit) that captures the image of the face of a viewer. For example, the camera pair 12 is attached so as to face the front position of the viewer (for example, an upper portion or the like of the display device 10) and captures the image of the face (both eyes in particular) of the viewer.

A web camera provided on a personal computer (PC), for example, can be used as the camera pair 12. The camera pair 12 may be embedded in a frame (not illustrated) or the like of the display device 10, for example, and an arrangement thereof may be changed appropriately.

The camera pair 12 includes two imaging devices which are a first camera 12a and a second camera 12b. The first and second cameras 12a and 12b are arranged in the horizontal direction at the same height and at positions located at an equal distance from the viewer. For example, as illustrated in FIG. 1, the first and second cameras 12a and 12b are preferably built in the frame or the like of the display device 10 or externally attached. Hereinafter, the first camera 12a is sometimes referred to as a left camera and the second camera 12b is sometimes referred to as a right camera.

The image captured by the camera pair 12 is transmitted to the display control device 13. When displaying the stereoscopic image, the camera pair 12 preferably transmits the captured images to the display control device 13 continuously.

In the stereoscopic image display apparatus 1, the camera pair 12 captures the image of the viewer, and the distance measurement processor 31 measures the distance between the viewer and the display surface 10a of the display device 10.

Figure 11:
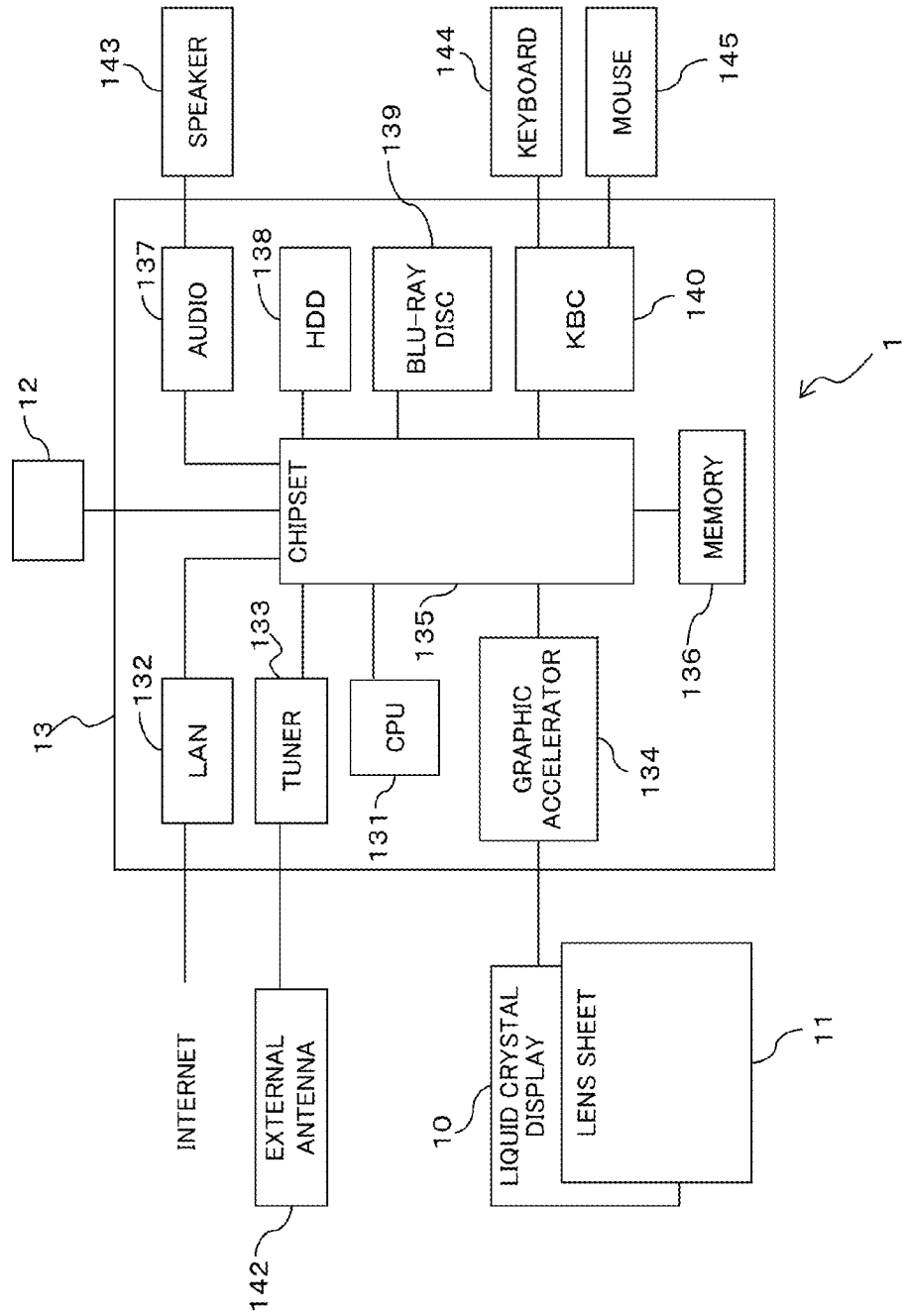
FIG. 11 is a diagram schematically illustrating a hardware configuration of a display control device of the stereoscopic image display apparatus which is an example of the first embodiment.

FIG. 11 is a diagram schematically illustrating the hardware configuration of the display control device 13 of the stereoscopic image display apparatus 1 which is an example of the first embodiment.

As illustrated in FIG. 11, the display control device 13 is configured, for example, as an information processing device (computer) that includes a central processing unit (CPU) 131, a local area network (LAN) card 132, a tuner 133, a graphic accelerator 134, a chipset 135, a memory 136, an audio controller 137, a hard disk drive (HDD) 138, a Blu-ray disc drive 139, and a keyboard controller 140.

The graphic accelerator 134 is an image display control interface to which the display device 10 is connected so as to allow the display device 10 to display images. The functions of the graphic accelerator 134 may be provided to the chipset 135. The LAN card 132 is an interface card for connecting to a network such as the Internet, and the tuner 133 is connected to an external antenna 142 to receive a TV program, performs a decoding process or the like, and displays the TV program on the display device 10 as image data.

The memory 136 is a storage device such as a random access memory (RAM) or a read only memory (ROM), for example, and stores various programs and data executed or used by the CPU 131.

The audio controller 137 is connected to a speaker 143 and controls output of audio data to the speaker 143.

The HDD 138 is a storage device and stores an operating system (OS), various programs, data, and the like executed or used by the CPU 131. Moreover, the HDD 138 and the memory 136 store data of various images (2-dimensional images and stereoscopic (3-dimensional) images) displayed on the display device 10.

Moreover, the HDD 138 stores stereoscopic image data created in advance for a stereoscopic display object (display object) as will be described later. That is, the HDD 138 functions as a storage unit that stores a parallax image of the display object, having a different parallax amount. Moreover, the HDD 138 stores a distance measurement table 41 (distance measurement correspondence information: see FIG. 16) described later.

The Blu-ray disc drive 139 reproduces a Blue-ray disc. Various types of image data displayed on the display device 10 may be stored in the Blue-ray disc. Moreover, a reproducing device capable of reproducing a recording medium (for example, a DVD or the like) other than the Blue-ray disc may be provided, and various types of image data stored in the recording medium may be reproduced.

The keyboard controller 140 is connected to an input device such as a keyboard 144 or a mouse 145 so as to control exchange of data between the keyboard 144 and the mouse 145 and the CPU 131. The chipset 135 is connected to these respective portions by a bus or the like so as to control communication between the CPU 131 and these respective portions. Moreover, the display control device 13 is connected to the camera pair 12 so as to receive the image of the face of the viewer, captured by the camera pair 12.

The CPU 131 is a processing device that realizes various functions by executing programs stored in the HDD 138 and the memory 136.

The CPU 131 executes an image reproduction application, for example, so that contents such as a moving image or a still image are displayed on the display surface 10a of the display device 10.

Moreover, in the stereoscopic image display apparatus 1, the CPU 131 functions as the distance measurement processor 31, a selecting unit 32, and a display control unit 33, as illustrated in FIG. 1. Moreover, the image reproduction application includes the functions of the distance measurement processor 31, the selecting unit 32, and the display control unit 33.

A program (the image reproduction application) for realizing the functions of the distance measurement processor 31, the selecting unit 32, and the display control unit 33 is provided in a form of being recorded on a computer-readable recording medium such as, for example, a flexible disk, a CD (CD-ROM, CD-R, CD-RW, and the like), a DVD (DVD-ROM, DVD-RAM, DVD-R, DVD+R, DVD-RW, DVD+RW, and the like), a Blue-ray disc, a magnetic disk, an optical disc, or an magneto-optical disc. A computer reads the program from the recording medium, transmits the program to an internal storage device or an external storage device, stores the program, and uses the program. Moreover, the program may be recorded on a storage device (recording medium) such as, for example, a magnetic disk, an optical disc, a magneto-optical disc, and the program may be provided from the storage device to a computer via a communication path.

When the functions of the distance measurement processor 31, the selecting unit 32, and the display control unit 33 are realized, the program stored in the internal storage device (the memory 136 in the present embodiment) is executed by a microprocessor (the CPU 131 in the present embodiment) of the computer. In this case, the program recorded on the recording medium may be read and executed by the computer.

In the present embodiment, the computer is a concept that includes hardware and an operating system and means hardware that operates under the control of the operating system. Moreover, when an operating system is not required and hardware is operated solely by an application program, the hardware itself corresponds to a computer. The hardware includes at least a microprocessor such as a CPU and means for reading computer programs recorded on the recording medium. In the present embodiment, the stereoscopic image display apparatus 1 has the function of a computer.

The distance measurement processor 31 measures the distance from the display surface 10a of the display device 10 to the viewer based on the image captured by the camera pair 12. The distance measurement processor 31 acquires the images of the viewer, captured by the two image capturing units of the first and second cameras 12a and 12b and calculates the distance to the viewer based on a shift amount (dots or a parallax amount) of these images.

FIG. 12 is a diagram for describing a positional relationship between the camera pair 12 and the imaging object of the stereoscopic image display apparatus 1 which is an example of the first embodiment.

The first and second cameras 12a and 12b are built at an approximately central position of the frame of the display device 10 facing the viewer. The distances to the viewer from the first and second cameras 12a and 12b are constant. That is, the first and second cameras 12a and 12b are disposed at positions at an equal distance from the object and at different positions in the horizontal direction.

The two cameras of the first and second cameras 12a and 12b capture images by focusing on the object (reference object) located at a reference position separated by a predetermined distance from the display surface 10a of the display device 10. The images (video frames) of the reference object captured by the first and second cameras 12a and 12b are referred to as reference images. The imaging object is the viewer, for example.

The distance measurement processor 31 superimposes the reference images received from the first and second cameras 12a and 12b to match the reference objects in the reference images. The distance measurement processor 31 stores the distance to the reference position from the display surface 10a of the display device 10 in the HDD 138 as reference viewpoint position information.

In the video frames of the object captured by the first and second cameras 12a and 12b, the parallax amount in the horizontal direction is different depending on the distance between the object and the display surface 10a of the display device 10 (that is, the distance between the object and the first and second cameras 12a and 12b).

The distance measurement processor 31 measures a parallax amount in the horizontal direction of the object between the video frames based on the video frames of the viewer captured by the first and second cameras 12a and 12b. The distance measurement processor 31 determines the distance to the viewer from the display surface 10a by referring to the distance measurement table 41 (see FIG. 16) registered in advance based on the measured parallax amount.

Figure 13A:
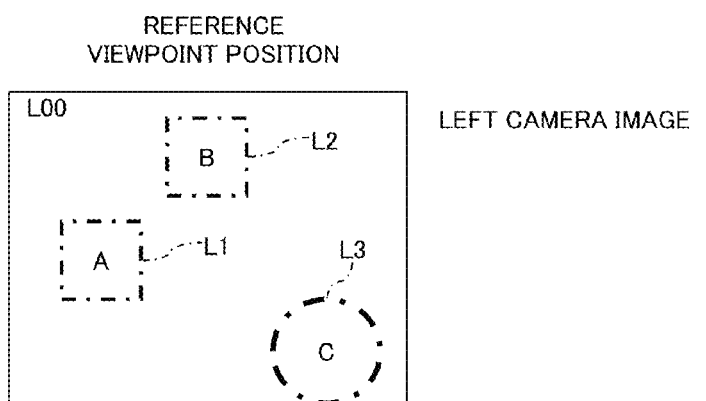
FIGS. 13A, 13B, and 13C are diagrams illustrating the relationship between an object position and an object image captured by a camera pair.
Figure 13B:
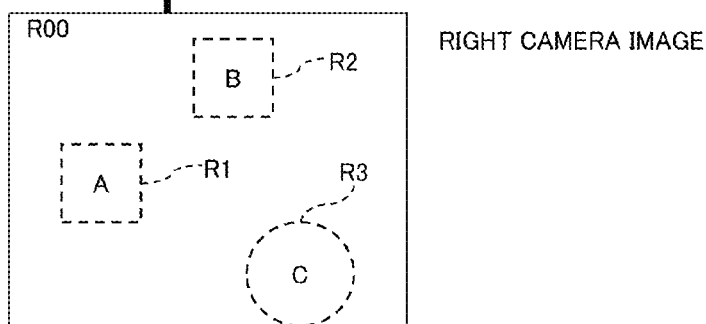
Figure 13C:
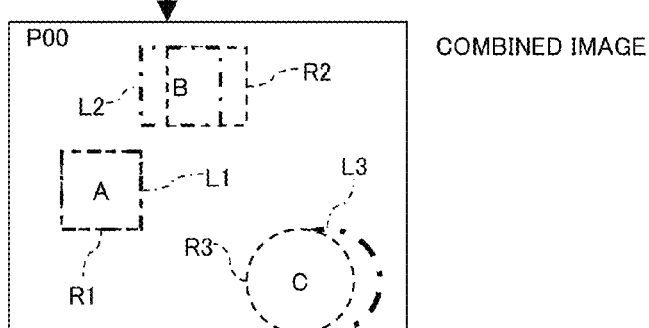

FIGS. 13A, 13B, and 13C are diagrams illustrating the relationship between an object position and an object image captured by the camera pair 12. FIG. 13A illustrates an image frame L00 in which the images of three objects are captured by the first camera 12a (the left camera), in which the captured images of the objects are depicted by one-dot chain line and denoted by reference numerals L1 to L3. FIG. 13B illustrates an image frame R00 in which the images of three objects are captured by the second camera 12b (the right camera), in which the captured images of the objects are depicted by dashed line and denoted by reference numerals R1 to R3. FIG. 13C illustrates an image frame P00 in which the image of FIG. 13A and the image of FIG. 13B are combined.

In FIGS. 13A, 13B, and 13C, reference numeral A indicates the viewer present at the reference viewpoint position. Reference numeral B indicates an object present at a position further than the reference viewpoint position in relation to the display device 10. Reference numeral C indicates an object present at a position closer than the reference viewpoint position in relation to the display device 10. In FIGS. 13A, 13B, and 13C, the object is depicted by a rectangle or a circle for the sake of convenience.

As illustrated in FIG. 13B, at the reference viewpoint position, the image R1 of the object A captured by the right camera matches the image L1 of the object A captured by the left camera, and a horizontal parallax amount is zero (hereinafter referred to as a zero parallax amount). Moreover, as for the object C positioned closer than the reference viewpoint position, the image L3 captured by the left camera is shifted rightward in the horizontal direction due to a reverse parallax in relation to the image R3 captured by the right camera. On the other hand, as for the object B positioned further than the reference viewpoint position, the image L2 captured by the left camera is shifted leftward in the horizontal direction in relation to the image R2 captured by the right camera.

FIGS. 14A, 14B, and 14C are drawings illustrating the relationship between an object position and an object image captured by the camera pair 12 and illustrates image frames L01, R01, and P01 in which the object A in the state of FIGS. 13A, 13B, and 13C has moved closer to the display device 10. Moreover, FIGS. 15A, 15B, and 15C are diagrams illustrating the relationship between an object position and an object image captured by the camera pair 12 and illustrates image frames L02, R02, and P02 in which the object A in the state of FIGS. 13A, 13B, and 13C has moved further from the display device 10.

As illustrated in FIG. 14C, when the object A (the viewer) moves closer to the display device 10, a reverse parallax occurs so that the image L1 of the object A captured by the left camera moves rightward in the horizontal direction due to the reverse parallax in relation to the image R1 of the object A captured by the right camera and a shift occurs. On the other hand, as illustrated in FIG. 15C, when the object A (the viewer) moves away from the display device 10, the image L1 of the object A captured by the left camera moves leftward in the horizontal direction in relation to the image R1 of the object A captured by the right camera and a shift occurs.

A shift amount in the horizontal direction of the images R1 and L1 of the object A depends on the distance between the object A and the display surface 10a of the display device 10. Thus, by measuring the shift amount, it is possible to detect the distance between the object A and the display surface 10a of the display device 10.

The shift amount is measured by comparing the image L1 of the object A in the image frames L01 and L02 with the image R1 of the object A in the image frames R01 and R02. That is, the distance measurement processor 31 compares the image R1 of the object A measured by the second camera 12b with the image L1 of the object A measured by the first camera 12a to detect a dot difference (shift amount) in the horizontal direction between these images R1 and L1.

Specifically, the distance measurement processor 31 detects the dot difference using the image of both eyes or one eye of the viewer as an image of the object A, for example. For example, when the image of both eyes of the viewer is used, a line connecting both eyes can be used.

The shift amount measured by the distance measurement processor 31 is stored in a predetermined storage area of the memory 136 or the like.

Moreover, the distance measurement processor 31 determines the distance to the object based on the detected shift amount by referring to the distance measurement table 41.

Figure 16:
FIG. 16 is a diagram illustrating a distance measurement table of the stereoscopic image display apparatus which is an example of the first embodiment.

FIG. 16 is a diagram illustrating the distance measurement table 41 of the stereoscopic image display apparatus 1 which is an example of the first embodiment.

The distance measurement table 41 is distance measurement information in which the dot difference between the images of the object captured by the right and left cameras and the distance to the object (the viewer) are correlated. In the example illustrated in FIG. 16, a table in which the viewer distance and the parallax range are correlated is illustrated as the distance measurement table 41.

The viewer distance is the distance to the viewer from the display surface 10*a* of the display device 10, and in the example illustrated in FIG. 16, four distances 1.00 m, 1.40 m, 1.80 m, and 2.20 m are used.

The parallax range indicates the range between an upper limit and a lower limit of the dot difference corresponding to the viewer distance. For example, when the dot difference has a value between 17 and 23, the viewer distance is 1.8 m. That is, the distance measurement table 41 is reference data for determining the distance from the display device 10 to the viewer based on the detected dot difference.

In the example illustrated in FIG. 16, the resolution in the horizontal direction of the images captured by the first and second cameras 12*a* and 12*b* is 1920 dots.

The distance measurement processor 31 calculates a dot difference between the images of the viewer captured by the right camera and the left camera, determines a parallax range in the distance measurement table 41 corresponding to the dot difference, and determines a viewer distance corresponding to the parallax range.

Figure 17:
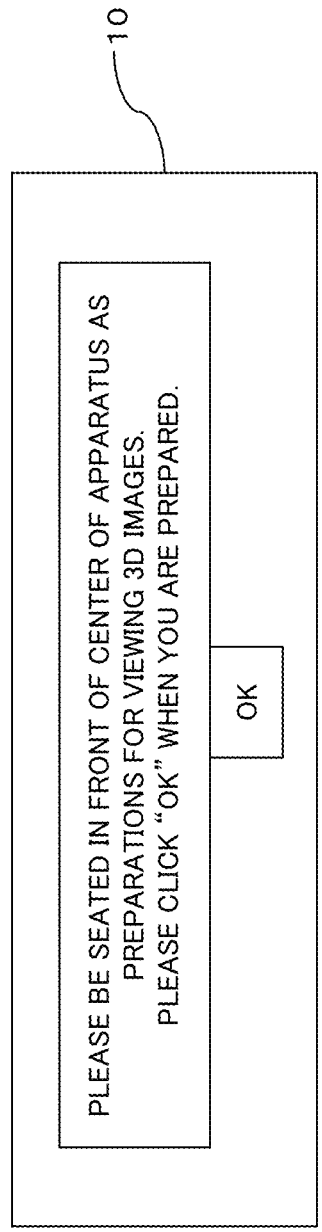
FIG. 17 is a diagram illustrating a dialog box of the stereoscopic image display apparatus which is an example of the first embodiment.

Moreover, when recognizing the position of the viewer, the distance measurement processor 31 displays such a dialog box as illustrated in FIG. 17 on the display device 10.

FIG. 17 is a diagram illustrating a dialog box of the stereoscopic image display apparatus 1 which is an example of the first embodiment.

In response to the message in the dialog box, the viewer moves to face the display device 10 (the camera pair 12) at a position corresponding to a predetermined distance to the display device 10, operates the keyboard 144 or the mouse 145, and selects "OK". In this way, the face of the viewer starts being captured by the camera pair 12. That is, the distance measurement processor 31 detects the dot difference between the images of both eyes of the viewer captured by the first and second cameras 12*a* and 12*b* and measures the distance to the viewer by referring to the distance measurement table 41 based on the dot difference.

Moreover, the distance measurement processor 31 may use the position of the viewer as the reference position when "OK" is selected in response to the dialog box illustrated in FIG. 17. That is, the distance measurement processor 31 matches the images of the viewer captured by the first and second cameras 12*a* and 12*b* at the reference position as reference images.

In this manner, the first and second cameras 12*a* and 12*b* built in the display device 10 at a predetermined distance from the viewer capture the image of the viewer as an object. Moreover, the distance measurement processor 31 recognizes the viewer in the video frames input simultaneously by the first and second cameras 12*a* and 12*b* as an object and detects the distance from the display surface 10*a* to the viewer from the parallax amount of the objects in the left and right images. As a result, it is possible to detect the viewpoint position of the viewer easily at a low cost. In this manner, the stereoscopic image display apparatus 1 detects the distance between the viewer and the display surface 10*a* of the display device 10 as sensor information obtained by the camera pair 12.

Moreover, when it is not possible to detect the viewer in the video frame received from the camera pair 12 or the dot difference is out of the range in the distance measurement table 41, the distance measurement processor 31 determines that the viewer is out of a normal viewing range and sends the determination result (out-of normal viewing range notification) to the selecting unit 32. This is because images are not focused on the eyes of the viewer by the lens sheet 11 at distances outside the range of viewer distances in the distance measurement table 41, and it is not possible to realize stereoscopic vision.

When the distance measurement processor 31 measures the distance to the viewer from the display surface 10*a* of the display device 10, the selecting unit 32 selects a stereoscopic image (a left-eye stereoscopic image and a right-eye stereoscopic image) corresponding to the level from the HDD 138 according to the distance measured by the distance measurement processor 31. The selecting unit 32 selects an image corresponding to the distance to the viewer from the display surface 10*a* among a plurality of images corresponding to the display object, of which the 3D effects are different, stored in the HDD 138 and displays the image on the display device 10.

FIGS. 18A, 18B, and 18C are diagrams for describing images (stereoscopic images) used in the stereoscopic image display apparatus 1 which is an example of the first embodiment. FIG. 18A is a diagram illustrating image data of a display object which is displayed stereoscopically, in which a triangular display object Ob1 is disposed in front of a rectangular display object Ob2.

FIG. 18B is a diagram illustrating stereoscopic image data of the image data illustrated in FIG. 18A, and FIG. 18C is a diagram illustrating two-dimensional image data of the image data illustrated in FIG. 18A.

In the stereoscopic image display apparatus 1, a plurality of images having different 3D effects is provided for one display object (see FIG. 18A). Specifically, as for one display object, a plurality of combinations of parallax images having different binocular parallax amounts is stored as a combination (stereoscopic image pair) of a right-eye stereoscopic image (right-eye image) and a left-eye stereoscopic image (left-eye image) in the HDD 138 as stereoscopic image data.

The left-eye stereoscopic image and the right-eye stereoscopic image have a predetermined binocular parallax. Due to this, the viewer can view the stereoscopic image stereoscopically in a state where the left-eye stereoscopic image is imaged on the left eye and the right-eye stereoscopic image is imaged on the right eye.

Hereinafter, a plurality of viewpoints having a parallax is referred to as parallax points. In the stereoscopic image display apparatus 1, binocular parallax stereoscopic vision is realized using a binocular parallax, and the right and left eyes of the viewer become parallax points. That is, the HDD 138 stores a left-eye parallax image and a right-eye parallax image which are created with a parallax so as to correspond to the left and right eyes as the parallax points. Moreover, the left-eye parallax image and the right-eye parallax image are combined whereby the stereoscopic image pair (3D image) is generated. Moreover, imaging parallax images having a binocular parallax on the right and left eyes to allow the viewer to view a stereoscopic image will be referred to as stereoscopic image display (3D display).

For example, in the example illustrated in FIG. 18B, four parallax images N1 to N4 are illustrated, in which the parallax image N1 is used as a parallax image imaged on either the left eye or the right eye, and the parallax images N2 to N4 are used as a parallax image imaged on the other eye. Hereinafter, an example in which the parallax image N1 is the left-eye parallax image and the parallax images N2 to N4 are the right-eye parallax image will be described. However, the parallax image N1 may be used as the right-eye parallax image and the parallax images N2 to N4 may be used as the left-eye parallax image.

The parallax images N2, N3, and N4 are multi-nocular stereoscopic image data having different binocular parallax amounts with respect to the parallax image N1. For example, the parallax image N4 has a largest binocular parallax amount with respect to the parallax image N1, and the binocular parallax amount decreases in the order of the parallax image N3 and the parallax image N2.

When the parallax images N2, N3, and N4 are selected and combined with the parallax image N1 as the stereoscopic image pairs and stereoscopic vision is performed, the effect of the stereoscopic vision (stereoscopic effect) is different depending on the combination of the parallax images.

In the example illustrated in FIG. 18B, stereoscopic image pairs (3D images) 1, 2, and 3 in which the parallax images N2, N3, and N4 are selectively combined with the parallax image N1 are generated.

Moreover, for example, when the 3D image 3 in which the parallax image N4 having a largest binocular parallax amount is combined with the parallax image N1 as a stereoscopic image pair is displayed on the display device 10, the object appears to protrude the most to the viewer. In contrast, when the 3D image 1 in which the parallax image N2 having a smallest binocular parallax amount is combined with the parallax image N1 is displayed on the display device 10, the amount of protruding of the object is smallest to the viewer.

A method of selecting the left-eye parallax image and the right-eye parallax image among the plurality of parallax images N1 to N4 may be appropriately changed.

The selecting unit 32 selects stereoscopic image pairs having a larger binocular parallax amount in accordance with decrease in the distance to the viewer, the distance being detected by the distance measurement processor 31. The selecting unit 32 selects stereoscopic image pairs having a smaller binocular parallax amount in accordance with increase in the distance to the viewer, the distance being detected by the distance measurement processor 31. In this way, the viewer can view stereoscopic images having a larger protruding of the stereoscopic image in accordance with decrease in the distance to the viewer, and can view stereoscopic images having a smaller protruding of the stereoscopic image in accordance with increase in the distance to the viewer.

In the example illustrated in FIGS. 18A, 18B, and 18C, as 3D image format data, the triangle Ob1 is the data present at the frontmost position. Thus, in the stereoscopic image pair, the binocular parallax of the triangle Ob1 is larger than the binocular parallax of the rectangle Ob2.

In this example, when the parallax image N1 is displayed as a pixel group imaged on the left eye, and the parallax image N4 is displayed as a pixel group imaged on the right eye, the triangle Ob1 appears to protrude the most to the viewer.

The parallax image is not limited to the four parallax images N1 to N4 illustrated in FIG. 18B but may include five or more parallax images.

The parallax image is created, for example, by demultiplexing 3D image format data, adding the Z-direction (depth direction) information to 2D images to obtain 3D image information, and performing rendering. In this case, by optionally changing the Z-direction information added to 2D images, various parallax images can be generated.

The selecting unit 32 selects a parallax image to be combined with the parallax image N1 as a stereoscopic image pair in relation to a display object from a plurality of (three in the example illustrated in FIG. 18B) parallax images N2 to N4 to generate a plurality of 3D images 1, 2, and 3.

For example, the viewer distance (see FIG. 16) is correlated with each of the parallax images N2 to N4 combined with the parallax image N1. The selecting unit 32 selects a parallax image corresponding to the determined viewer distance to generate a 3D image corresponding to the viewer distance.

That is, the selecting unit 32 selects different 3D images depending on the distance between the viewer and the display surface 10a of the display device 10 and displays the 3D images to thereby decrease the parallax amount when the viewer is at a distance from the display surface 10a and to increase the parallax amount when the viewer approaches the display surface 10a.

When the selecting unit 32 appropriately selects a parallax image to be combined with the parallax image N1 and displays the selected parallax images on the left and right eyes, it is possible to control the 3D sense and the 3D effect by comparing the background and the object. That is, a pixel arrangement (image) for 3D imaging having an optimal parallax corresponding to a viewpoint position (distance) of the viewer is selected among stereoscopic image data made up of images synchronized with the display object.

Rather than correlating the viewer distance with each of the parallax images N2 to N4, the viewer distance may be correlated with a combination of the parallax images N2 to N4 and the parallax image N1 and various modifications may occur.

Moreover, the parallax images N1 to N4 can be created using various methods. For example, by capturing the image of the display object from different positions in the horizontal direction, a plurality of parallax images N1 to N4 having a binocular parallax may be created.

In the 3D image format metadata (header information), the number of parallax images having different 3D effects, synchronized with the image data is recorded as the number of synchronized images. In the example illustrated in FIG. 18B, the number of synchronized images is 4.

The selecting unit 32 selects two parallax images corresponding to the viewer distance as the left-eye image and the right-eye image among these four parallax images.

Moreover, when the out-of normal viewing range notification is received from the distance measurement processor 31, the selecting unit 32 selects the same parallax image (for example, the parallax image N1) in the left-eye image and the right-eye image. When the same parallax image in the left-eye image and the right-eye image is displayed on the display device 10, it is recognized by the viewer as if a 2-dimensional image having no parallax is displayed.

Hereinafter, displaying the same parallax image in the left-eye image and the right-eye image on the display device 10 is sometimes referred to as performing 2D display.

When the selecting unit 32 detects that the stereoscopic image display apparatus 1 does not satisfy a 3D image reproduction environment (for example, when the sensor could not detect that the lens sheet 11 is attached to the display device 10), the selecting unit 32 performs 2D display.

Further, the selecting unit 32 may detect that the stereoscopic image display apparatus 1 does not satisfy the 3D image reproduction environment based on a model ID or the like registered in advance in the display control device 13, for example, and various modification may occur.

The display control unit 33 performs control such that the stereoscopic image selected by the selecting unit 32 is displayed on the display device 10. The display control unit 33 displays the two parallax images selected as the left-eye image and the right-eye image by the selecting unit 32 simultaneously on the display surface 10a of the display device 10. In this case, the display control unit 33 displays the left-eye image and the right-eye image on the display surface 10a so that the left-eye image is displayed for the left-eye display element used for displaying the left-eye image and the right-eye image is displayed for the right-eye display element used for displaying the right-eye image. Moreover, the display control unit 33 displays the left-eye image and the right-eye image using the display elements corresponding to the focal distance corresponding to the viewer distance among the display pixels of the display surface 10a of the display device 10.

That is, the pixels are displayed so that the pixels that form the stereoscopic image correspond to the display elements of the display surface 10a. A method of displaying images on the display device 10 can be realized using various existing methods, and detailed description thereof will not be provided.

Next, a pixel group arrangement of the display unit 10a of the display device 10 in the stereoscopic image display apparatus 1 will be described.

In the stereoscopic image display apparatus 1, the display control unit 33 uses the display elements differently in 3D display and 2D display.

FIGS. 19A and 19B and FIGS. 20A and 20B are diagrams illustrating examples of a display state of the display surface 10a of the stereoscopic image display apparatus 1 which is an example of the embodiment. FIG. 19A is a diagram illustrating left-eye display elements in a 2D display state, and FIG. 19B is a diagram illustrating right-eye display elements in a 2D display state. Moreover, FIG. 20A is a diagram illustrating left-eye display elements in a 3D display state, and FIG. 20B is a diagram illustrating right-eye display elements in a 3D display state.

In the examples illustrated in FIGS. 19A and 19B and FIGS. 20A and 20B, for the sake of convenience, among the display elements of the display surface 10a, an arrangement of sixteen (4×4) display elements is extracted from the left-eye display elements and the right-eye display elements, respectively, and is illustrated.

Moreover, in FIGS. 20A and 20B, an example in which the lens sheet 11 is a 4-view lens sheet including four lens arrays (four optical units) having viewer distances of 1.0 m, 1.4 m, 1.8 m, and 2.2 m is illustrated. That is, the lens sheet 11 includes lens arrays capable of imaging four different views for left and right sides in the horizontal direction.

As illustrated in FIGS. 19A and 19B, when 2D display is performed, the display device 10 of the stereoscopic image display apparatus 1 displays one pixel using three display elements (R, G, B) successive in the horizontal direction. In the example illustrated in FIG. 19A, one pixel of the left-eye image is expressed by display elements (L4RN1, L3GN1, L2BN1). That is, (R, G, B)=(L4RN1, L3GN1, L2BN1). Similarly, in the example illustrated in FIG. 19B, one pixel of the right-eye image is expressed by display elements (R4RN1, R3GN1, R2BN1).

As illustrated in FIGS. 20A and 20B, when 3D display is performed, one pixel is displayed using three display elements (R, G, B) successive in an oblique direction. In the example illustrated in FIGS. 20A and 20B, although the display elements that forms one pixel are arranged in a bottom-right oblique direction, the present invention is not limited to this and various modifications may occur.

An example in which the parallax image N1 illustrated in FIG. 18B is imaged on the left eye and the parallax image N2 is imaged on the right eye is illustrated. In the examples illustrated in FIGS. 20A and 20B, the pixels L1 to L4 are pixels of the left-eye image, and the pixels R1 to R4 are pixels of the right-eye image. Moreover, light emitted from the pixels L4 and R4 passes through a lens array (1.0 m lens array) that forms an image at a distance of 1.00 m from the display surface 10a. Similarly, light emitted from the pixels L3 and R3 passes through a lens array (1.4 m lens array) that forms an image at a distance of 1.40 m from the display surface 10a, and light emitted from the pixels L2 and R2 passes through a lens array (1.8 m lens array) that forms an image at a distance of 1.8 m from the display surface 10a. Moreover, light emitted from the pixels L1 and R1 passes through a lens array (2.2 m lens array) that forms an image at a distance of 2.2 m from the display surface 10a Moreover, different parallax images are assigned to the respective 4-view lens arrays. Preferably, at least the same number of parallax images as the number of views of the lens array are provided as a plurality of parallax images having different binocular parallax amounts corresponding to the parallax image N1 illustrated in FIG. 18B.

The display control unit 33 displays a group of pixels of the parallax images by performing control such that only the display elements of the lens arrays corresponding to the viewer distance detected by the distance measurement processor 31 emit light.

For example, a case where the distance measurement processor 31 has detected that the distance between the viewer and the display surface 10a of the display device 10 is 1.00 m will be described. The display control unit 33 allows the display elements corresponding to the 1.0 m lens array in FIGS. 20A and 20B to emit light to display the pixel group of the parallax image.

For example, the display control unit 33 displays the pixels of the left-eye parallax image (for example, the parallax image N1) using the display elements corresponding to the 1.0 m lens among the display elements illustrated in FIG. 20A. That is, (R, G, B)=(L4RN1, L4GN1, L4BN1).

Moreover, the display control unit 33 displays the pixels of the right-eye parallax image (for example, the parallax image N2) using the display elements corresponding to the 1.0 m lens among the display elements illustrated in FIG. 20B. That is, (R, G, B)=(R4RN2, R4GN2, L4BN2). Moreover, in this case, the display control unit 33 suppresses emission of the display elements corresponding to the lens arrays (for example, 1.4 m, 1.8 m, and 2.2 m lens arrays) that do not correspond to the viewer distance detected by the distance measurement processor 31. In this way, unnecessary light may not enter the eyes of the viewer, and the viewer can view high-quality images.

In this manner, the display control unit 33 changes the arrangement of the image data in pixel units between 2D display and 3D display. Moreover, the same parallax image is displayed on the display device 10 in the left-eye image and the right-eye image whereby 2-dimensional image display (2D display) is realized. The parallax image common to the left and right eyes used for 2D display is not limited to the parallax image N1, and various modifications may occur.

Figure 21A:
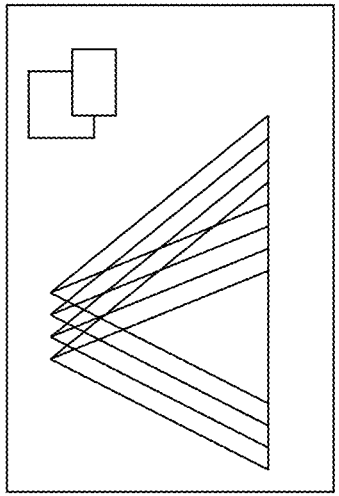
FIGS. 21A and 21B are diagrams for describing 2D display of the stereoscopic image display apparatus which is an example of the first embodiment.
Figure 21B:
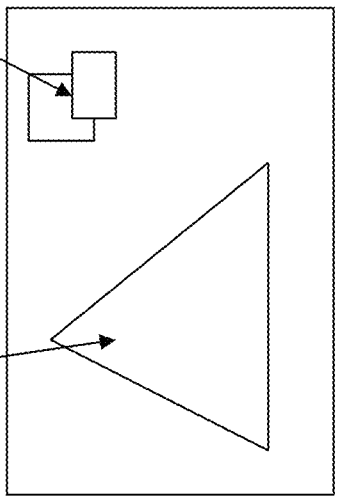

FIGS. 21A and 21B are diagrams for describing 2D display in the stereoscopic image display apparatus 1 which is an example of the first embodiment. FIG. 21A is a diagram schematically illustrating a 2D display state in the stereoscopic image display apparatus 1, and FIG. 21B is a diagram schematically illustrating a display state according to a conventional display control method.

In the display device 10 including the lens sheet 11 of the stereoscopic image display apparatus 1, a case where the same parallax image is displayed on the display device 10 in the left-eye image and the right-eye image using the conventional display control method will be described. In the conventional stereoscopic display method, images are displayed using all display pixels of the display device. In this way, as illustrated in FIG. 21B, when the conventional display control method is used, the object serving as a stereoscopic image is recognized as multiple images (four superimposed images in the example illustrated in FIG. 21B) in which only the same number of images as the number of imaging points overlap. In this case, the respective superimposed images are not imaged on the eyes of the viewer but are viewed in a blurring state by the viewer.

On the other hand, in the stereoscopic image display apparatus 1, since the display control unit 33 displays the parallax image using only the display elements corresponding to the viewer distance, crosstalk is suppressed and the parallax images are not recognized as multiple images as illustrated in FIG. 21A. Due to this, unnecessary light does not enter the eyes of the viewer, and the viewer can view high-quality images.

Figure 22:
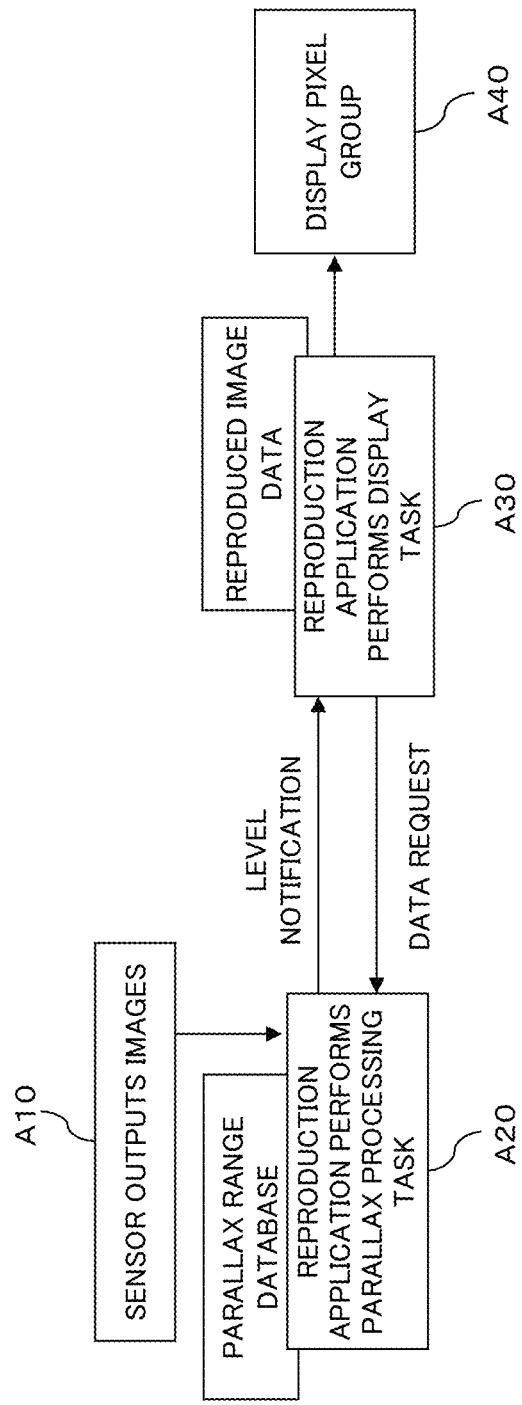
FIG. 22 is a block diagram schematically illustrating a functional configuration of the stereoscopic image display apparatus which is an example of the first embodiment.

FIG. 22 is a block diagram schematically illustrating the functional configuration of the stereoscopic image display apparatus 1 which is an example of the first embodiment.

In the stereoscopic image display apparatus 1 of the first embodiment, the facial image of the viewer is captured and output by the camera pair 12 (see A10). Subsequently, the distance measurement processor 31 detects a dot difference (parallax amount) from the respective images of the viewer (see A20). Moreover, the distance measurement processor 31 determines a viewer distance by referring to the distance measurement table 41 based on the detected dot difference. The determined viewer distance is sent to the selecting unit 32 as a level notification, and the selecting unit 32 selects a stereoscopic image pair satisfying the viewer distance from the HDD 138. The display control unit 33 performs a process of reproducing the selected stereoscopic display image pair (see A30). Moreover, the level notification may be sent in response to a data request from the selecting unit 32.

In the reproduction process, the display control unit 33 displays a pixel group of one parallax image of the stereoscopic image pair as the right-eye display pixel of the display device 10 and displays a pixel group of the other parallax image of the stereoscopic image pair as the left-eye display pixel of the display device 10 (see A40).

An outline of a stereoscopic image display method of the stereoscopic image display apparatus 1 which is an example of the first embodiment, having the above-described configuration will be described using FIG. 23.

In the stereoscopic image display apparatus 1, first, the camera pair 12 captures the image of the viewer (the eyes in particular). The images captured by the first and second cameras 12a and 12b of the camera pair 12 are output and input to the distance measurement processor 31 (see B10). The distance measurement processor 31 detects both eyes of the viewer from the captured images (see B20) and measures a shift amount of the images of both eyes. The distance measurement processor 31 determines the distance between the viewer and the display surface 10a of the display device 10 by referring to the distance measurement table 41 based on the shift amount and sends the distance to the selecting unit 32 (see B30).

The selecting unit 32 selects images (stereoscopic image pair, pixel group) to be displayed on the display device 10 according to the sent distance to the viewer. The display control unit 33 displays the stereoscopic image pair selected by the selecting unit 32 using display pixels that form images at the detected viewer position, of the display surface 10a of the display device 10 (see B40).

Figure 24:
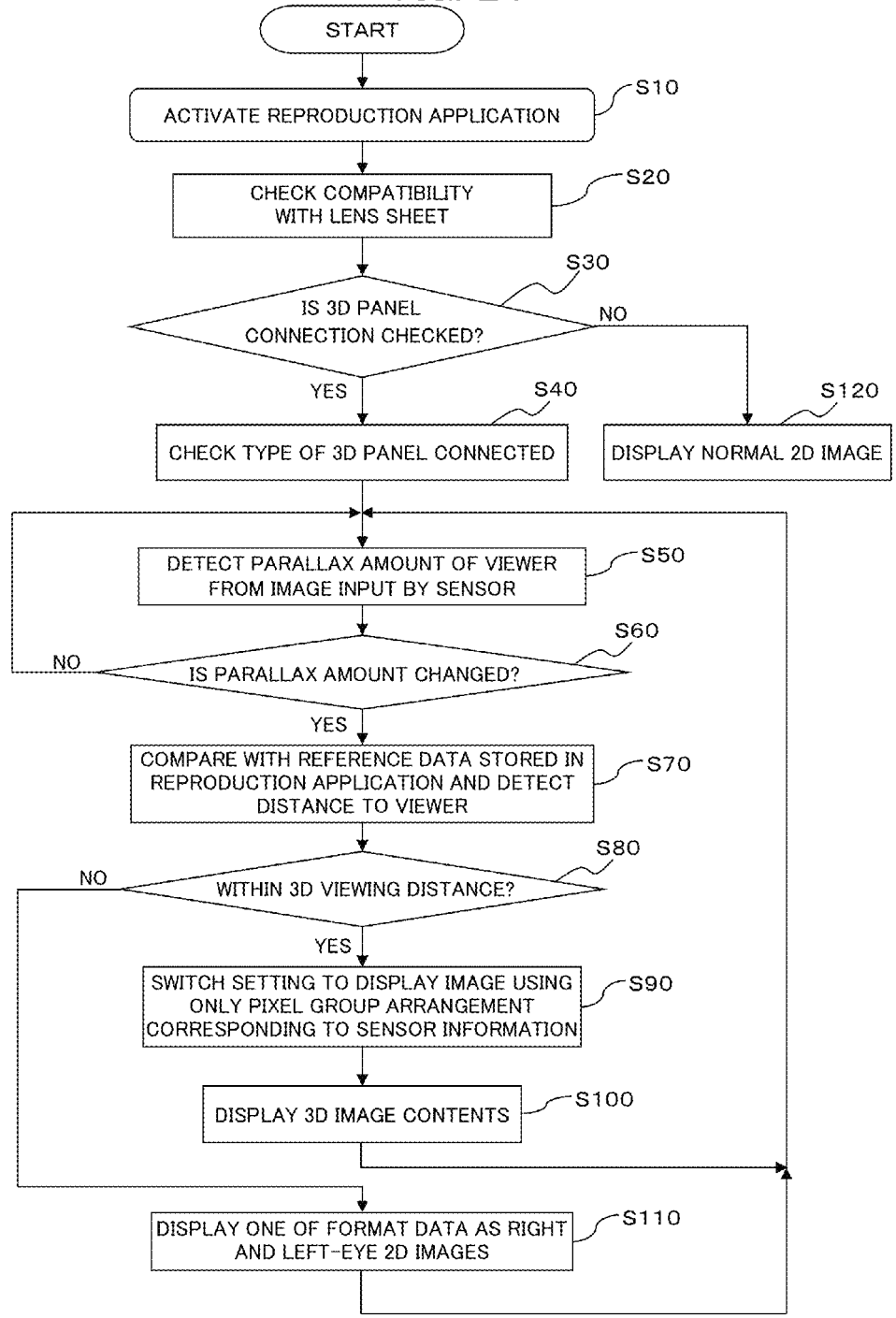
FIG. 24 is a flowchart for describing a stereoscopic image display method in the stereoscopic image display apparatus which is an example of the first embodiment.
Figure 25:
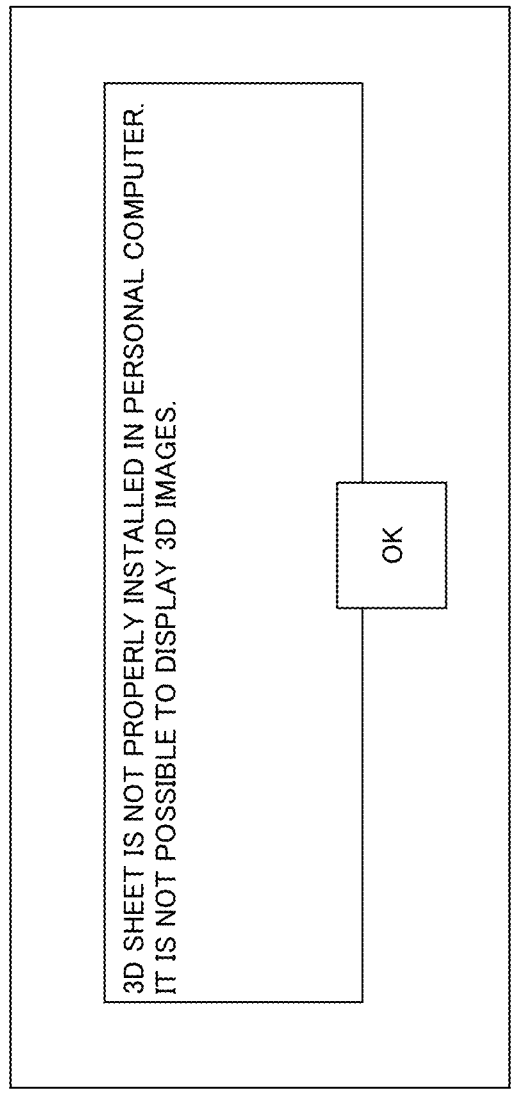
FIG. 25 is a diagram illustrating a dialog box of the stereoscopic image display apparatus which is an example of the first embodiment.

Next, a stereoscopic image display method of the stereoscopic image display apparatus 1 of the first embodiment will be described according to a flowchart (steps S10 to S120) illustrated in FIG. 24. FIG. 25 is a diagram illustrating a dialog box of the stereoscopic image display apparatus 1 as an example of the first embodiment.

In the stereoscopic image display apparatus 1, when the image reproduction application is activated (step S10), first, the image reproduction application checks whether the stereoscopic image display apparatus 1 is a lens-type stereoscopic image display apparatus 1 (step S20). This is checked by checking the model ID or the like stored in the memory 136, the HDD 138, or the like of the display control device 13 of the stereoscopic image display apparatus 1, for example.

After that, it is checked whether the lens sheet 11 (3D panel) is attached to the display device 10 (step S30). For example, the image reproduction application determines whether the lens sheet 11 is attached based on a detection result of the sensor that detects attachment of the lens sheet 11 to the display device 10.

When the determination result shows that the lens sheet 11 is not attached to the display device 10 (step S30: NO), a dialog box indicating that it is possible to display stereoscopic images as illustrated in FIG. 25 is displayed on the display device 10, and 2D display is performed (step S120).

Moreover, when the lens sheet 11 is attached to the display device 10 (step S30: YES), the 3D panel ID of the attached lens sheet 11 is checked to identify the type of the lens sheet 11 (step S40).

In the lens-type stereoscopic image display apparatus 1, an arrangement of pixel groups is different depending on the structure (for example, the number of imaging points and an oblique direction of the lens array) of the lens sheet 11. In the display control device 13, the display control unit 33 controls the display elements of the display device 10 according to the identified type of the lens sheet 11.

In the present embodiment, for the sake of convenience, although the 3-viewpoint lens sheet 11 in which the number of imaging points (viewpoint points) is 3 is described as an example, the present invention is not limited to this, and the configuration of the lens sheet 11 may be changed appropriately.

The distance measurement processor 31 detects a parallax amount of the positions of both pupils based on the facial images of the viewer captured by the first and second cameras 12a and 12b of the camera pair 12 (step S50). The distance measurement processor 31 compares the parallax amount of the viewer detected in step S50 with the previous parallax amount recorded in the memory 136 or the like to check whether the parallax amount has been changed (step S60). When there is no change in the parallax amount (step S60: NO), the flow returns to step S50. In the initial processing during activation of the stereoscopic image display apparatus 1, since the value stored as the previous parallax amount is initialized, it is determined that the parallax amount has been changed. A predetermined design value is appropriately used as the initial value.

When the parallax amount has been changed (step S60: YES), the distance measurement processor 31 determines the distance (viewer distance) to the viewer from the display surface 10a of the display device 10 by referring to the distance measurement table 41 (reference data) (step S70).

The distance measurement processor 31 checks whether the determined distance to the viewer falls within a 3D viewing distance range stored in advance in the image reproduction application as reference data (step S80). When the viewer distance is not included in the reference data (step S80: NO), the selecting unit 32 selects the same parallax image in the left-eye image and the right-eye image. The display control unit 33 displays the selected same parallax image on the display device 10 to realize 2-dimensional image display (2D display) (step S110). After that, the flow returns to step S50.

On the other hand, when the viewer distance is included in the reference data (step S80: YES), the selecting unit 32 selects a stereoscopic image pair having the binocular parallax corresponding to the viewer distance. The display control unit 33 switches to such setting that only the display elements (pixel group arrangement) of the display device corresponding to the viewer distance are used for the selected stereoscopic display image pair (step S90). That is, the display control unit 33 displays the selected right-eye parallax image and left-eye parallax image (3D image contents) using only the display elements of the display device 10 corresponding to the viewer distance to perform 3D display (step S100). After that, the flow returns to step S50.

As described above, according to the stereoscopic image display apparatus 1 which is an example of the first embodiment, the distance measurement processor 31 measures the shift amount of the images of the viewer from the video frames captured by the camera pair 12 and determines the distance between the viewer and the display surface 10a of the display device 10 by referring to the distance measurement table 41 based on the shift amount. The selecting unit 32 selects a stereoscopic image pair having a binocular parallax meeting the distance to the viewer. The display control unit 33 displays the stereoscopic image pair using the display pixel of the display surface 10a of the display device 10, capable of forming an image at the detected viewer distance.

Specifically, the selecting unit 32 selects stereoscopic image pairs having a larger binocular parallax amount in accordance with decrease in the distance to the viewer, the distance being detected by the distance measurement processor 31. The selecting unit 32 selects stereoscopic image pairs having a smaller binocular parallax amount in accordance with increase in the distance to the viewer, the distance being detected by the distance measurement processor 31. In this way, the viewer can view the stereoscopic images having a larger protruding of the stereoscopic image in accordance with decrease in the distance to the viewer, and can view stereoscopic images having a smaller protruding of the stereoscopic image in accordance with increase in the distance to the viewer. Thus, the viewer can experience a more realistic image effect. That is, the stereoscopic image including the stereoscopic image pairs having a binocular parallax ideal for the viewer distance can be imaged on the eyes of the viewer, and the stereoscopic image can be imaged at the viewpoint position of the viewer.

According to the visual characteristics of human, when a person views an object at a distance, a binocular parallax amount decreases in proportion to the distance to the object and the person can view the object. In the stereoscopic image display apparatus 1, since images are displayed so that a stereoscopic effect changes depending on the distance from the viewer to the display device 10, the viewer can experience more realistic images.

Moreover, the camera pair 12 constantly captures the images of the viewer, the distance measurement processor 31 frequently measures the viewer distance, and the selecting unit 32 frequently selects the stereoscopic image pair. In this way, it is possible to form the stereoscopic image made up of stereoscopic image pairs having the binocular parallax corresponding to the position of the viewer according to a movement of the viewer in front of the display device 10.

The viewer distance is measured based on the images of the viewer captured by the camera pair 12. Due to this, it is not necessary to provide a dedicated device for measuring the viewer distance, measure the viewer distance at a low cost, and reduce the manufacturing cost. Moreover, in this case, the load on the CPU 131 or the like can be reduced. However, the viewer distance may be measured based on information other than the images captured by the camera pair 12. That is, for example, the viewer distance may be measured using various existing sensors or the like.

When the stereoscopic image pair is displayed on the display device 10, the display control unit 33 displays the stereoscopic image pair using only the display elements corresponding to the viewer distance and suppresses emission of display elements other than the display elements corresponding to the viewer distance. Due to this, it is possible to reduce the image processing load on the CPU 131 or the like of the display control device 13. Moreover, the viewer can view high-quality stereoscopic images.

The lens sheet 11 includes a plurality of optical units having a plurality of lenticular-shaped lenses, and these optical units are stacked. Thus, the image displayed on the display device 10 can be imaged at a plurality of distances from the display surface 10a of the display device 10. Due to this, the viewer can view the stereoscopic image displayed on the display device 10 at a plurality of positions from the display device 10.

That is, 3D images are realized in real-time and at a low cost such that different images are viewed at an accurate focal distance depending on the viewing position of the viewer.

Figure 26:
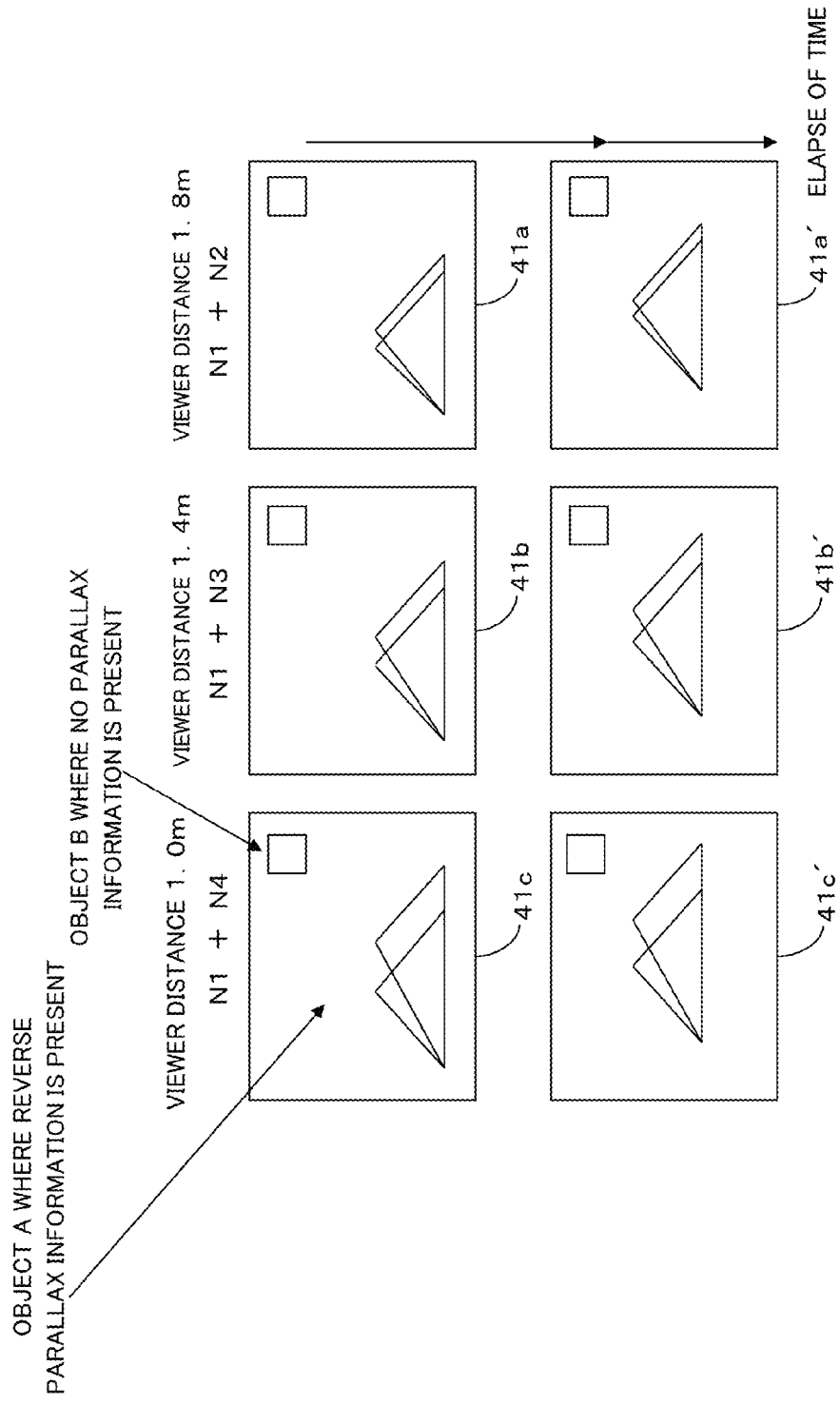
FIG. 26 is a diagram illustrating a display example of stereoscopic images when viewer distances are different in the stereoscopic image display apparatus which is an example of the first embodiment.

FIG. 26 is a diagram illustrating a display example of a stereoscopic image when the viewer distances are different in the stereoscopic image display apparatus 1 which is an example of the first embodiment. In FIG. 26, images 41a, 41b, and 41c illustrated on the upper side change to images 41a', 41b', and 41c' illustrated on the lower side after a predetermined period.

The respective images 41a, 41b, and 41c include an object A having reverse parallax information and an object B with no parallax information. The object A moves to the right side of the drawing after elapse of a predetermined period.

In the stereoscopic image display apparatus 1, a case where the parallax images N1 to N4 of the same image, illustrated in FIG. 18B are displayed at different viewing positions will be described as an example.

A combination (N1+N2) of the parallax images N1 and N2 having the smallest binocular parallax amount at the focal distance (viewer distance) of 1.8 m is displayed.

Similarly, a combination (N1+N3) of the parallax images N1 and N3 is displayed at the viewer distance of 1.4 m, and a combination (N1+N4) of the parallax images N1 and N4 is displayed at the viewer distance 1.0 m.

In general, when a viewer moves closer to a display device on which an object having reverse parallax information is displayed, since the parallax amount increases as the distance to the display device decreases, the amount of protruding experienced by the viewer decreases.

In the stereoscopic image display apparatus 1, when the viewer positioned at the position of the viewer distance 1.8 m moves closer to the display device 10 in the order of the viewer distances 1.4 m and 1.0 m, the distance measurement processor 31 detects the position of the viewer and the selecting unit 32 switches the image 41a sequentially to the images 41b and 41c. As a result, as the viewer approaches the display device 10, the binocular parallax of the object A displayed on the display device 10 increases. Thus, the amount of protruding experienced by the viewer, of the 3D image of the object A which is an imaginary space displayed on the display device 10 increases with the movement of the viewer, and it is possible to obtain a more real viewing effect.

In a normal space, the further the object is located, the smaller the parallax amount, and thus, the perspective of the distant object disappears. However, in the conventional 3D image display apparatus, the forward parallax of an object captured at a distant position increases, the depth sense experienced by the viewer increases, and the object appears to be different from the real one.

In contrast, in the stereoscopic image display apparatus 1, when the viewer approaches the display device 10, as described above, the binocular parallax of the object A displayed on the display device 10 increases and the amount of protruding or the depth sense increases. Due to this, the viewer can experience a 3D effect closer to the real one.

(B) Second Embodiment

Although the stereoscopic image display apparatus 1 of the first embodiment is a so-called lens-type naked-eye scheme that realizes stereoscopic vision with the naked eyes using the lens sheet 11, the present invention is not limited to this. That is, the present method can be applied to a scheme that realizes stereoscopic vision using a polarizing filter or a frame shutter (active shutter) that requires stereoscopic glasses for causing individual images to be forcibly viewed on the left and right eyes of a viewer. Hereinafter, a scheme that realizes stereoscopic vision using glasses such as a polarizing filter scheme or a frame shutter scheme is referred to as a glasses scheme. In the case of the polarizing filter scheme, a polarizing filter layer is formed on the display surface 10a of the display device 10.

In the glasses scheme, a side-by-side scheme is used as a stereoscopic image format, for example.

Figure 27:
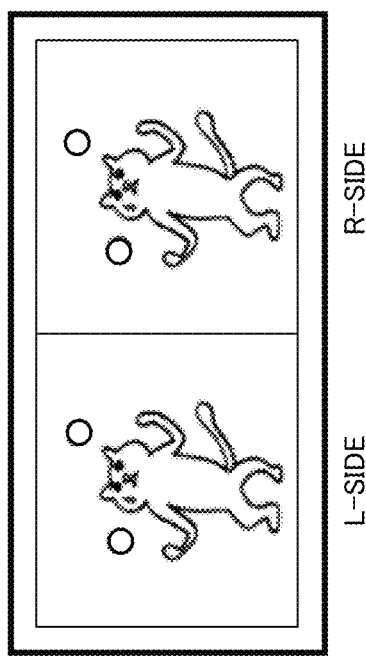
FIG. 27 is a diagram schematically illustrating a side-by-side-type stereoscopic image format.

FIG. 27 is a diagram schematically illustrating a stereoscopic image format of the side-by-side scheme. In the stereoscopic image format of the side-by-side scheme, an image (hereinafter referred to as an L-side image) imaged on the left eye and an image (hereinafter referred to as a R-side image) imaged on the right eye are present in one frame. The viewer views the L-side image and the R-side image as different video frames.

The side-by-side scheme, the polarizing filter scheme, and the frame shutter scheme are existing methods, and detailed description thereof will not be provided.

The stereoscopic image display apparatus 1 which is an example of the second embodiment includes stereoscopic glasses (not illustrated) instead of the lens sheet 11 of the first embodiment. The other configurations are the same as those of the stereoscopic image display apparatus 1 of the first embodiment.

However, in the second embodiment, since the viewer wears the stereoscopic glasses, the distance measurement processor 31 detects a dot difference based on the image of other portion (for example, the profile of the face or the like of the viewer) rather than both eyes (pupils) of the viewer captured by the camera pair 12. Moreover, the distance measurement processor 31 may detect a dot difference based on the image of the stereoscopic glasses worn on the viewer, captured by the camera pair 12, and other modifications may occur.

The stereoscopic glasses are a display device that allows a stereoscopic image to be viewed on the eyes of the viewer and input a left-eye image and a right-eye image having a binocular parallax to the eyes of the viewer via the glasses. That is, in the stereoscopic image display apparatus 1 of the second embodiment, the stereoscopic glasses function as a display unit that displays the selected stereoscopic display image pair. The configuration and the like of the stereoscopic glasses are already known, and detailed description thereof will not be provided.

Since the stereoscopic image display apparatus 1 which is an example of the second embodiment does not include the display device 10, the display control unit 33 does not perform such control that one pixel is displayed using three display elements (R, G, B) successive in the oblique direction as illustrated in FIGS. 20A and 20B. Due to this, it is not necessary to perform a process of preventing crosstalk on the naked-eye scheme.

Figure 28:
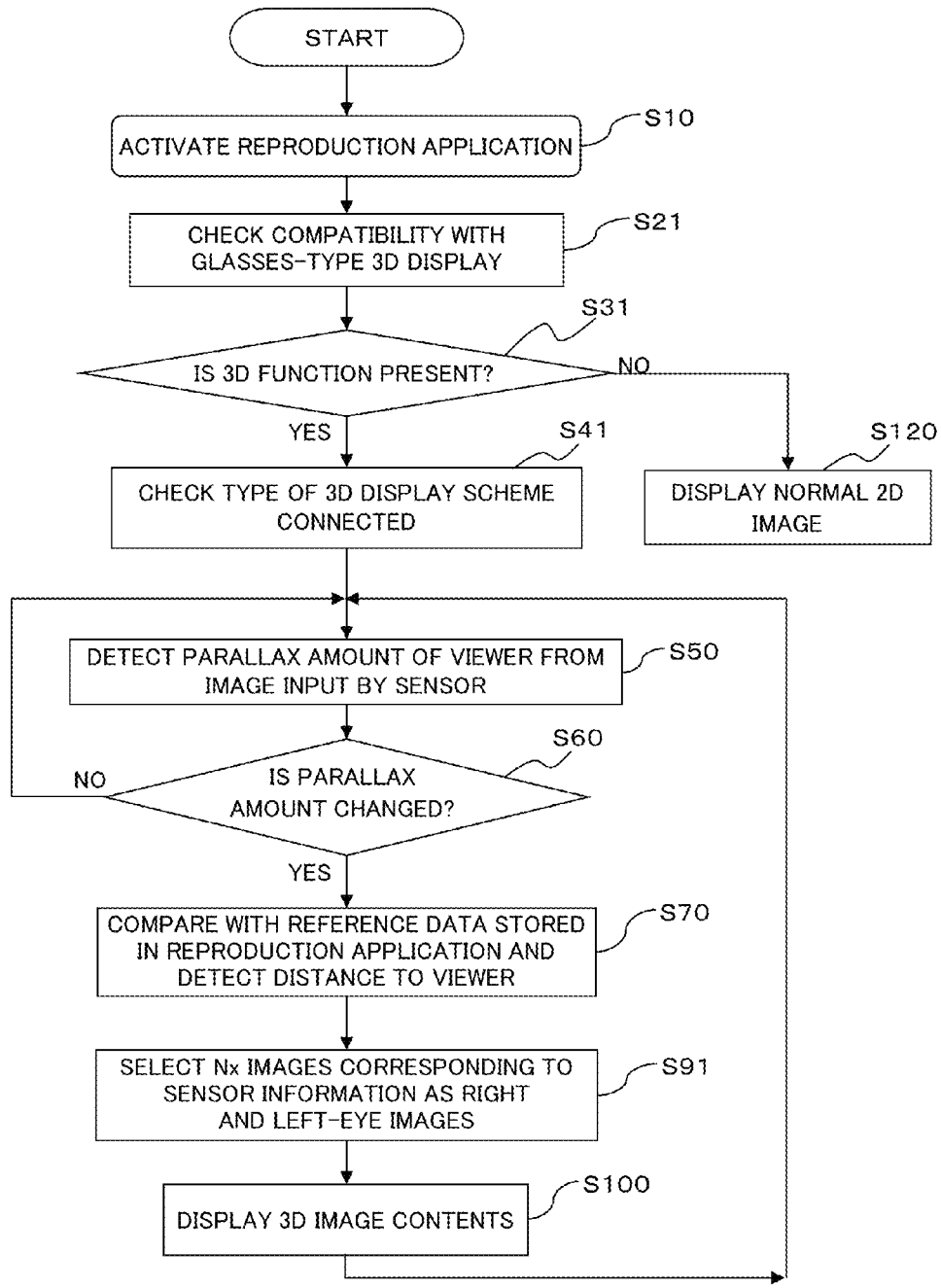
FIG. 28 is a flowchart for describing a stereoscopic image display method in the stereoscopic image display apparatus which is an example of a second embodiment.

A stereoscopic image display method of the stereoscopic image display apparatus 1 which is an example of the second embodiment will be described according to a flowchart (steps S10, S21 to S41, S50 to S70, S91, S100, and S120) illustrated in FIG. 28. The steps denoted by the same reference numerals as the reference numerals described in the flowchart illustrated in FIG. 24 indicate the same process as those of FIG. 24, and detailed description thereof will not be provided.

In the stereoscopic image display apparatus 1, when the image reproduction application is activated (step S10), first, the image reproduction application checks whether the stereoscopic image display apparatus 1 is a glasses-type stereoscopic image display apparatus 1 (step S21). This is checked by checking the model ID or the like stored in the memory 136, the HDD 138, or the like of the display control device 13 of the stereoscopic image display apparatus 1, for example.

Based on the checking result, it is determined whether the apparatus has a 3D display function (step S31). When the apparatus does not have the 3D display function (step S31: NO), a dialog box indicating that it is not possible to display stereoscopic images as illustrated in FIG. 25 is displayed on the display device 10, and 2D display is performed (step S120).

Moreover, when the apparatus has the 3D display function (step S31: YES), for example, the type of the 3D display scheme is checked based on the apparatus ID or the like, for example (step S41).

For example, it is identified whether the 3D display scheme of the apparatus is a polarizing scheme or a frame sequential scheme. This is because the polarizing scheme that displays left and right images on the display device 10 in respective lines and the frame sequential scheme that switches the left and right images every predetermined period employ different image display methods.

In the display control device 13, the display control unit 33 controls the display elements of the display device 10 according to the identified type of the 3D display scheme.

The distance measurement processor 31 detects a parallax amount of the positions of both pupils based on the facial images of the viewer captured by the first and second cameras 12a and 12b of the camera pair 12 (step S50). The distance measurement processor 31 compares the parallax amount of the viewer detected in step S50 with the previous parallax amount recorded in the memory 136 or the like to check whether the parallax amount has been changed (step S60). When there is no change in the parallax amount (step S60: NO), the flow returns to step S50. In the initial processing during activation of the stereoscopic image display apparatus 1, since the value stored as the previous parallax amount is initialized, it is determined that the parallax amount has been changed.

When the parallax amount has been changed (step S60: YES), the distance measurement processor 31 determines the distance (viewer distance) to the viewer from the display surface 10a of the display device 10 by referring to the distance measurement table 41 (reference data) (step S70).

Since the stereoscopic image display apparatus 1 of the second embodiment includes the stereoscopic glasses and does not use the lens sheet 11, the stereoscopic image display apparatus does not depend on the position of the viewer and does not need to check the focal distance range.

The selecting unit 32 selects a stereoscopic image pair having the binocular parallax corresponding to the viewer distance (step S91). The display control unit 33 displays the selected stereoscopic display image pair on the display device to perform 3D display (step S100). After that, the flow returns to step S50.

As described above, according to the stereoscopic image display apparatus 1 which is an example of the second embodiment, it is possible to obtain the same advantages as the first embodiment.

That is, the distance measurement processor 31 measures the shift amount of the images of the viewer from the video frames captured by the camera pair 12 and determines the distance between the viewer and the display surface 10a of the display device 10 by referring to the distance measurement table 41 based on the shift amount. The selecting unit 32 selects a stereoscopic image pair having a binocular parallax meeting the distance to the viewer. The display control unit 33 displays the stereoscopic image pair using the display pixel of the display surface 10a of the display device 10, capable of forming an image at the detected viewer distance.

Specifically, the selecting unit 32 selects stereoscopic image pairs having a larger binocular parallax amount in accordance with decrease in the distance to the viewer, the distance being detected by the distance measurement processor 31. The selecting unit 32 selects stereoscopic image pairs having a smaller binocular parallax amount in accordance with increase in the distance to the viewer, the distance being detected by the distance measurement processor 31. In this way, the viewer can view the stereoscopic images having a larger protruding of the stereoscopic image in accordance with decrease in the distance to the viewer, and can view stereoscopic images having a smaller protruding of the stereoscopic image in accordance with increase in the distance to the viewer. Thus, the viewer can experience a more realistic image effect. That is, the stereoscopic image including the stereoscopic image pairs having a binocular parallax ideal for the viewer distance can be imaged on the eyes of the viewer.

Moreover, the camera pair 12 constantly captures the images of the viewer, the distance measurement processor 31 frequently measures the viewer distance, and the selecting unit 32 frequently selects the stereoscopic image pair. In this way, it is possible to form the stereoscopic image made up of stereoscopic image pairs having the binocular parallax corresponding to the position of the viewer according to a movement of the viewer in front of the display device 10.

Since the viewer distance is measured based on the images of the viewer captured by the camera pair 12, it is not necessary to provide a dedicated device, measure the viewer distance at a low cost, and reduce the manufacturing cost. Moreover, in this case, the load on the CPU 131 or the like can be reduced. However, the viewer distance may be measured based on information other than the images captured by the camera pair 12. That is, for example, the viewer distance may be measured using various existing sensors or the like.

(C) Third Embodiment

Figure 29:
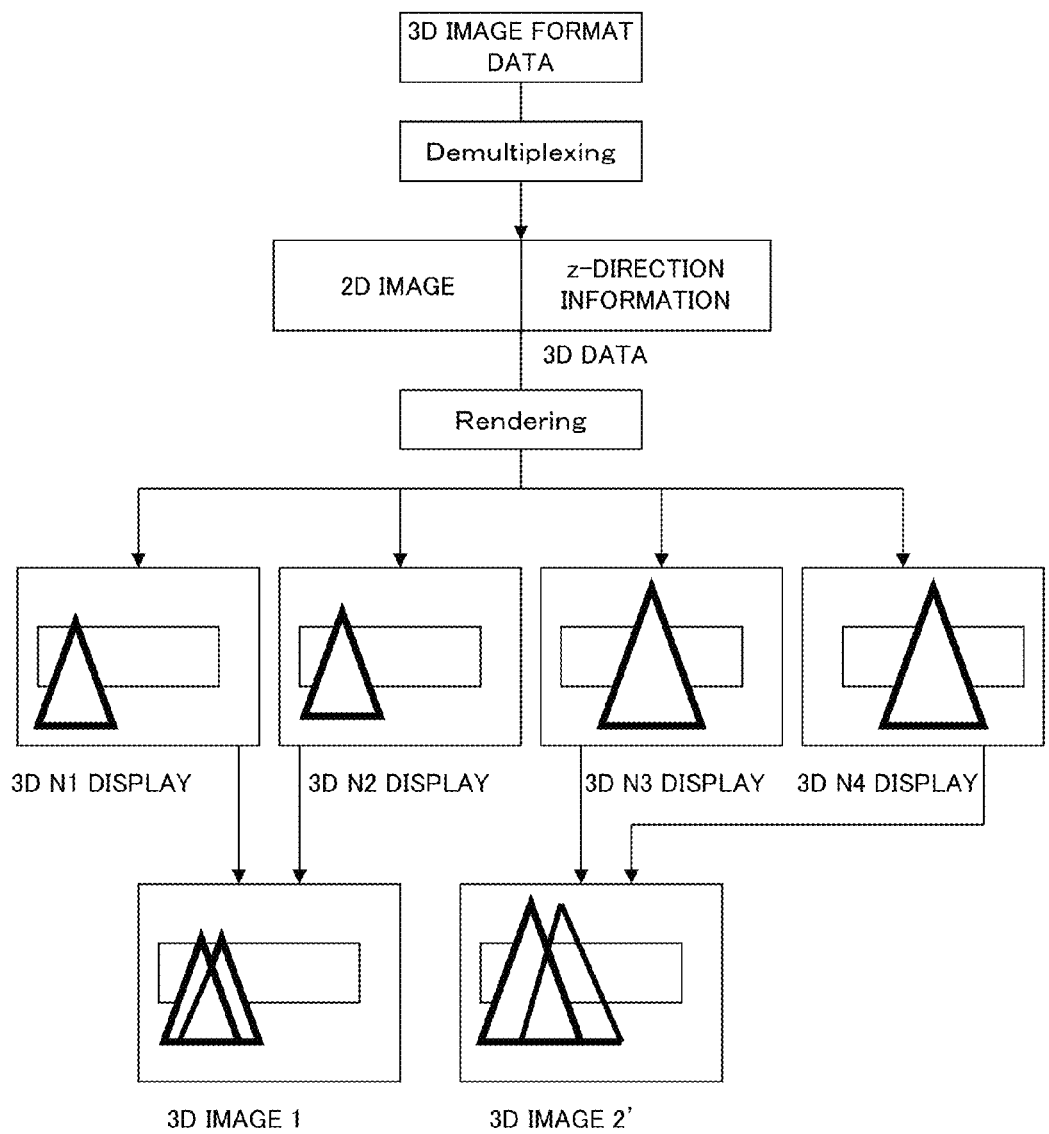
FIG. 29 is a diagram for describing a stereoscopic image used in a stereoscopic image display apparatus which is an example of a third embodiment.

FIG. 29 is a diagram for describing an image (stereoscopic image) used in a stereoscopic image display apparatus 1 which is an example of a third embodiment and is a diagram illustrating the stereoscopic image data corresponding to the image data illustrated in FIG. 18A.

In the first embodiment, a plurality of parallax images having different binocular parallax amounts as illustrated in FIG. 18B is stored in the HDD 138 for one display object (see FIG. 18A). That is, the selecting unit 32 selects a combination of a right-eye image and a left-eye image having a binocular parallax, stored in the HDD 138 as the stereoscopic image pair.

When a viewer views an object directly with naked eyes, the object appears to be large as the viewer approaches the object, whereas the object appears to be small as the viewer moves away from the object. That is, due to the perspective, an object at a close distance appears to be large and an object at a distance appears to be small.

In the stereoscopic image display apparatus 1 which is an example of the third embodiment, it is possible to reproduce such perspective in a 3D image.

In the third embodiment, rather than providing a plurality of parallax images having different binocular parallax amounts for one display object (see FIG. 18A) as illustrated in FIG. 18B, stereoscopic image pairs having different sizes of the display object Ob2 as well as having different binocular parallax amounts as illustrated in FIG. 29 are provided.

For example, in the example illustrated in FIG. 29, four parallax images N1 to N4 are illustrated, in which the parallax image N1 is used as a parallax image imaged on either the left eye or the right eye, and the parallax image N2 is used as a parallax image imaged on the other eye. Similarly, the parallax image N3 is used as a parallax image imaged on either the left eye or the right eye, and the parallax image N4 is used as a parallax image imaged on the other eye.

Hereinafter, an example in which the parallax images N1 and N3 are left-eye parallax images and the parallax images N2 and N4 are right-eye parallax images will be described. However, the parallax images N1 and N3 may be used as the right-eye parallax images and the parallax images N2 and N4 may be used as the left-eye parallax images.

The parallax image N2 is stereoscopic image data having a different binocular parallax amount in relation to the parallax image N1, and the parallax image N4 is stereoscopic image data having a different binocular parallax amount in relation to the parallax image N3. Moreover, the binocular parallax amount between the parallax images N3 and N4 is larger than the binocular parallax amount between the parallax images N1 and N2.

Further, the size of the display object Ob1 in the parallax images N3 and N4 is larger than that of the parallax images N1 and N2.

When the stereoscopic image pair (3D image 1) in which the parallax image N4 is combined with the parallax image N3 is displayed stereoscopically, the effect (stereoscopic effect) of stereoscopic vision is different from that when the stereoscopic image pair (3D image 2) in which the parallax image N2 is combined with the parallax image N1 is displayed stereoscopically. Specifically, when the 3D image 2 in which the parallax image N4 is combined with the parallax image N3 is displayed on the display device 10, the display object Ob1 is viewed at a closer position to the viewer than the 3D image 1 in which the parallax image N2 is combined with the parallax image N1, and the display object Ob1 appears to protrude.

The selecting unit 32 selects stereoscopic image pairs such that the smaller the viewer distance detected by the distance measurement processor 31, the larger the binocular parallax amount of the stereoscopic image pair selected preferentially and the larger the size of the display object of the stereoscopic image pair selected preferentially.

Due to this, the viewer can view the stereoscopic image having a larger protruding of the stereoscopic image and the display object having a larger size of the display object, in accordance with decrease in the distance to the viewer. On the other hand, the viewer can view the stereoscopic image having a smaller protruding of the stereoscopic image and the display object having a smaller size of the display object in accordance with increase in the distance to the viewer. Due to this, the viewer can experience the same visual effect as when the viewer views the object directly with the naked eyes.

In the third embodiment described above, two stereoscopic image pairs of the 3D images 1 and 2 having different binocular parallax amounts and object sizes are illustrated for a display object. However, the present invention is not limited to this, but the display object may have three or more stereoscopic image pairs having different binocular parallax amounts and at least three stereoscopic image pairs having different object sizes, and various modifications may occur.

(D) Others

The present invention is not limited to the above-described embodiments, and various modifications can occur without departing from the spirit of the present invention.

For example, in the respective embodiments described above, although the display device 10 is a liquid crystal display, the present invention is not limited to this. For example, the display device 10 may be other display devices such as a plasma display or a cathode ray tube (CRT) display.

In the first embodiment described above, although an example in which a lenticular scheme using the lenticular lens (the lens sheet 11) is used has been illustrated, the present invention is not limited to this. For example, a parallax barrier scheme that includes a shading barrier on a side of the display device 10 close to the display surface 10a instead of the lens sheet 11 may be used.

In the second embodiment described above, although images of the side-by-side scheme have been illustrated as an example of the stereoscopic image format, the present invention is not limited to this. For example, the stereoscopic image format may be constructed by adding depth information (z-direction information) to normal 20 image data, various modifications may occur.

The respective embodiments disclosed in the present invention may allow those skilled in the art to implement and manufacture the disclosed technique.

The viewer can experience a more real stereoscopic vision effect.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A stereoscopic image display apparatus comprising:
   a distance measuring unit that measures a distance to a viewer;
   a selecting unit that selects parallax images having a binocular parallax amount corresponding to the measured distance to the viewer from parallax images of a display object based on the measured distance to the viewer as a stereoscopic image pair;
   a display unit that includes a plurality of display elements arranged in a matrix form along an arrangement direction and a direction perpendicular to the arrangement direction and a lens sheet including a plurality of lens arrays, each of the plurality of lens arrays being arranged along an oblique display element group including a plurality of display elements successive in an oblique direction to the arrangement direction among the plurality of display elements arranged in the matrix form and imaging light output from each of the plurality of display elements included in the oblique display elements group, and
   a display control unit that causes the display unit to display the selected stereoscopic display image pair, wherein
   the selecting unit selects a left-eye parallax image and a right-eye parallax image having no binocular parallax amount as the stereoscopic display image pair, and the display control unit causes the display unit to display a non-stereoscopic image, and
   the display control unit suppresses emission of one or more of the plurality of display elements corresponding to one or more of the plurality of lens arrays not corresponding to the measured distance to the viewer.

2. The stereoscopic image display apparatus according to claim 1, wherein
   the selecting unit selects parallax images having a larger parallax amount as the stereoscopic display image pair as the distance to the viewer is shorter.

3. The stereoscopic image display apparatus according to claim 1, wherein
the distance measuring unit includes a plurality of image capturing units capable of capturing the image of the viewer, and
the distance to the viewer is measured based on a shift amount of the images of the viewer captured by the plurality of image capturing units.

4. The stereoscopic image display apparatus according to claim 3, wherein
the distance measuring unit calculates the distance to the viewer by referring to distance measurement correspondence information which is stored in a recording unit and in which the shift amount and the distance to the viewer are correlated with each other in advance.

5. The stereoscopic image display apparatus according to claim 3, wherein
the distance measuring unit captures the images of both eyes of the viewer using the image capturing unit.

6. A non-transitory computer-readable recording medium storing a program for causing a computer to execute an image display control function of displaying an image on a display device, the display device including a plurality of display elements arranged in a matrix form along an arrangement direction and a direction perpendicular to the arrangement direction and a lens sheet including a plurality of lens arrays, each of the plurality of lens arrays being arranged along an oblique display element group including a plurality of display elements successive in an oblique direction to the arrangement direction among the plurality of display elements arranged in the matrix form and imaging light output from each of the plurality of display elements included in the oblique display elements group, the program causing the computer to execute processes of:
in displaying a stereoscopic image,
measuring a distance to a viewer;
selecting parallax images having a binocular parallax amount corresponding to the measured distance to the viewer from parallax images of a display object based on the measured distance to the viewer as a stereoscopic display image pair; and
causing a display unit to display the selected stereoscopic display image pair, and
in displaying a non-stereoscopic image,
selecting a left-eye parallax image and a right-eye parallax image having no binocular parallax amount as the stereoscopic display image pair, and
causing the display unit to display the selected stereoscopic display image pair by suppressing emission of one or more of the plurality of display elements corresponding to one or more of the plurality of lens arrays not corresponding to the measured distance.

7. The non-transitory computer-readable recording medium storing the program according to claim 6, wherein
in the process of selecting as the stereoscopic display image pair, the selected parallax images have a larger amount of parallax in accordance with decrease in the distance to the viewer.

8. The non-transitory computer-readable recording medium storing the program according to claim 6, wherein
in the process of measuring the distance to the viewer, the distance to the viewer is measured based on a shift amount of the images of the viewer captured by a plurality of image capturing units capable of capturing the image of the viewer.

9. The non-transitory computer-readable recording medium storing the program according to claim 8, wherein
in the process of measuring the distance to the viewer, the distance to the viewer is calculated by referring to distance measurement correspondence information which is stored in a recording unit and in which the shift amount and the distance to the viewer are correlated with each other in advance.

10. The non-transitory computer-readable recording medium storing the program according to claim 8, wherein
the process of measuring the distance to the viewer is performed based on the images of both eyes of the viewer, captured by the image capturing unit.

* * * * *